(12) United States Patent
Zaidy et al.

(10) Patent No.: US 11,675,624 B2
(45) Date of Patent: Jun. 13, 2023

(54) INFERENCE ENGINE CIRCUIT ARCHITECTURE

(71) Applicant: Micron Technology, Inc., Boise, ID (US)

(72) Inventors: Aliasger Zaidy, Seattle, WA (US); Andre Xian Ming Chang, Seattle, WA (US); Eugenio Culurciello, Seattle, WA (US)

(73) Assignee: Micron Technology, Inc., Boise, ID (US)

(*) Notice: Subject to any disclaimer, the term of this patent is extended or adjusted under 35 U.S.C. 154(b) by 578 days.

(21) Appl. No.: 16/833,610

(22) Filed: Mar. 29, 2020

(65) Prior Publication Data

US 2021/0303358 A1 Sep. 30, 2021

(51) Int. Cl.
*G06F 7/50* (2006.01)
*G06F 9/50* (2006.01)
(Continued)

(52) U.S. Cl.
CPC .............. *G06F 9/5027* (2013.01); *G06F 7/50* (2013.01); *G06F 7/523* (2013.01);
(Continued)

(58) Field of Classification Search
CPC . G06N 3/08; G06N 3/063; G06N 3/04; G06F 9/5027; G06F 9/3895; G06F 9/545;
(Continued)

(56) References Cited

U.S. PATENT DOCUMENTS 8,442,927 B2 5/2013 Chakradhar et al.
8,533,431 B2 9/2013 Master et al.
(Continued)

OTHER PUBLICATIONS

Notification of Transmittal of the International Search Report and Written Opinion of the International Searching Authority, or the Declaration for International Application No. PCT/US2020/025592, dated Jan. 18, 2021, pp. 1-15.
(Continued)

*Primary Examiner* — Ernest Unelus
(74) *Attorney, Agent, or Firm* — Nancy R. Gamburd; Gamburd Law Group LLC

(57) ABSTRACT

An inference engine circuit architecture is disclosed which includes a matrix-matrix (MM) processor circuit and a MM accelerator circuit having multiple operating modes to provide a complete matrix multiplication. A representative MM accelerator circuit includes a first buffer circuit storing maps data; a first data network; multiple second buffer circuits each storing different kernel data; multiple second, serial data networks, with each coupled to a corresponding second buffer circuit; and a plurality of vector-vector (VV) acceleration circuits arranged in a plurality of arrays. Each VV acceleration circuit includes multiply and accumulate circuits; a shift register; a control multiplexer to provide a selected output, in response to a mode control word, of a bias parameter or a first accumulation sum; and a second adder circuit which adds the multiplicative product to the bias parameter or to the first accumulation sum to generate a second or next accumulation sum.

25 Claims, 11 Drawing Sheets

(51) Int. Cl.
G06F 7/523 (2006.01)
G06F 9/30 (2018.01)
G06F 9/54 (2006.01)
G06N 3/063 (2023.01)
(52) U.S. Cl.
CPC .......... G06F 9/30098 (2013.01); G06F 9/544 (2013.01); G06N 3/063 (2013.01)
(58) Field of Classification Search
CPC .. G06F 9/30098; G06F 9/544; G06F 9/30105; G06F 7/50; G06F 7/523
See application file for complete search history.

(56) References Cited

U.S. PATENT DOCUMENTS

| 8,620,881 | B2 | 12/2013 | Chamberlain et al. |
| 2008/0120260 | A1 | 5/2008 | Yancey |
| 2018/0341495 | A1* | 11/2018 | Culurciello ............... G06N 3/08 |

OTHER PUBLICATIONS

Zaidy, Aliasger et al., A High Efficiency Accelerator for Deep Neural Networks, 2018 1st Workshop on Energy Efficient Machine Learning and Cognitive Computing for Embedded Applications (EMC2), IEEE, Mar. 25, 2018, pp. 9-13, XP033441891.
Gokhale, Vinayak et al., Snowflake: A Model Agnositc Accelerator for Deep Convolutional Neural Networks, arXiv.org, Cornell University Library, arXiv: 1708.02579v1 [cs.AR], Aug. 8, 2017, pp. 1-11.
A. Krizhevsky, One weird trick for parallelizing convolutional neural networks, arXiv.org, Cornell University Library, arXiv:1404. 5997v2 [cs.NE], https://arxiv.org/abs/1404.5997, Apr. 26, 2014, pp. 1-7.
C. Szegedy et al., Going deeper with convolutions, The IEEE Conference on Computer Vision and Pattern Recognition (CVPR), Jun. 2015, pp. 1-9.
C. Szegedy et al., Rethinking the inception architecture for computer vision, CoRR, vol. abs/1512.00567, 2015, pp. 1-9.
K. He et al., "Deep residual learning for image , recognition," CoRR, vol. abs/1512.03385, 2015, pp. 1-9.
J. Long et al., Fully convolutional networks for semantic segmentation in the IEEE Conference on Computer Vision and Pattern Recognition (CVPR), Jun. 2015, pp. 1-10.
Z. Wu et al., Wider or deeper: Revisiting the resnet model for visual recognition,CoRR, vol. abs/1611.10080, arXiv.org, Cornell University Library, arXiv:1611.10080v1 [cs.CV], Nov. 30, 2016, pp. 1-19.
A. Conneau et al., Very deep convolutional networks for text classification, arXiv.org, Cornell University Library, arXiv:1606. 01781v2 [cs.CL], Jan. 27, 2017, pp. 1-10.
Y. LeCun et al., Gradient-based learning applied to document recognition, Proceedings of the IEEE, vol. 86, No. 11, Nov. 1998, pp. 2278-2324.
O. Russakovsky et al., ImageNet Large Scale Visual Recognition Challenge, International Journal of Computer Vision (IJCV), vol. 115, No. 3, pp. 211-252, 2015.
K. He et al., Delving deep into rectifiers: Surpassing human-level performance on imagenet classification, CoRR, vol. abs/1502. 01852, Feb. 2015.
C. Szegedy et al., Inception-v4, inceptionresnet and the impact of residual connections on learning, CoRR, Proceedings of the Thirty-First AAAI Conference on Artificial Intelligence (AAAI-17), vol. abs/1602.07261, 2016.
S. Han et al. Deep compression: Compressing deep neural networks with pruning, trained quantization and huffman coding, International Conference on Learning Representations (ICLR), arXiv.org, Cornell University Library, arXiv:1510.00149v5 [cs.CV], Feb. 15, 2016, pp. 1-14.

F. N. Iandola et al., Squeezenet: Alexnet-level accuracy with 50x fewer parameters and <1mb model size, CoRR, vol. abs/1602. 07360, arXiv.org, Cornell University Library, arXiv:1602.07360v4 [cs.CV], Nov. 4, 2016, pp. 1-13.
S. Han et al., Eie: Efficient inference engine on compressed deep neural network, 2016 ACM/IEEE 43rd Annual International Symposium on Computer Architecture, 2016, pp. 243-254.
S. Han et al., Learning both weights and connections for efficient neural network, Advances in Neural Information Processing Systems (NIPS), pp. 1135-1143, 2015.
T. Chen et al., Diannao: A small-footprint high-throughput accelerator for ubiquitous machine-learning, in Proceedings of the 19th International Conference on Architectural Support for Programming Languages and Operating Systems, ASPLOS '14, (New York, NY, USA), pp. 269-284, ACM, 2014.
Z. Du et al., Shidiannao: Shifting vision processing closer to the sensor, Proceedings of the 42nd Annual International Symposium on Computer Architecture, ISCA '15, (New York, NY, USA), pp. 92-104, ACM, 2015.
C. Zhang et al., Caffeine: Towards uniformed representation and acceleration for deep convolutional neural networks, Proceedings of the 35th International Conference on Computer-Aided Design, ICCAD '16, (New York, NY, USA), p. 12:1-12:8, ACM, 2016.
J. Qiu et al., Going deeper with embedded FPGA platform for convolutional neural network, Proceedings of the 2016 ACM/SIGDA International Symposium on Field-Programmable Gate Arrays, FPGA '16, (New York, NY, USA), pp. 26-35, ACM, 2016.
A. Krizhevsky et al., Imagenet classification with deep convolutional neural networks, Advances in Neural Information Processing Systems 25 (F. Pereira, C. J. C. Burges, L. Bottou, and K. Q. Weinberger, eds.), Curran Associates, Inc., 2012, pp. 1097-1105.
K. Simonyan et al., Very deep convolutional networks for large-scale image recognition, CoRR, vol. abs/1409.1556, arXiv.org, Cornell University Library, arXiv:1409.1556v6 [cs.CV], Apr. 10, 2015, pp. 1-14.
V. Gokhale et al., A 240 g-ops/s mobile coprocessor for deep neural networks, in Proceedings of the IEEE Conference on Computer Vision and Pattern Recognition Workshops, pp. 682-687, 2014.
C. Farabet et al., Bio-inspired vision processor for ultra-fast object categorization, Proc. High Performance Embedded Computing Workshop, 2010.
S. Gupta et al., Deep learning with limited numerical precision., Proceedings of the 32nd International Conference on Machine Learning, Lille, France, 2015. JMLR: W&CP vol. 37., pp. 1737-1746.
Y. H. Chen et al., Eyeriss: A spatial architecture for energy-efficient dataflow for convolutional neural networks, 2016 ACM/IEEE 43rd Annual International Symposium on Computer Architecture, vol. 44, p. 367-379, Jun. 2016.
Y. H. Chen et al., Eyeriss: An energy efficient reconfigurable accelerator for deep convolutional neural networks, IEEE Journal of Solid-State Circuits, vol. 52, Jan. 2017, pp. 127-138.
C. Zhang et al., Optimizing FPGA-based accelerator design for deep convolutional neural networks, Proceedings of the 2015 ACM/SIGDA International Symposium on Field-Programmable Gate Arrays, FPGA '15, (New York, NY, USA), pp. 161-170, ACM, 2015.
P. Meloni et al., Curbing the roofline: A scalable and flexible architecture for CNNs on FPGA, Proceedings of the ACM International Conference on Computing Frontiers, CF '16, (New York, NY, USA), pp. 376-383, ACM, 2016.
E. Azarkhish et al., Neurostream: Scalable and energy efficient deep learning with smart memory cubes, IEEE Transactions on Parallel and Distributed Systems, vol. 29, No. 2, Feb. 2018, pp. 420-134.
L. Cavigelli et al., Origami: A 803-GOp/s/W Convolutional Network Accelerator, IEEE Transactions on Circuits and Systems for Video Technology, vol. 27, No. 11, Nov. 2017, pp. 2461-2475.

* cited by examiner

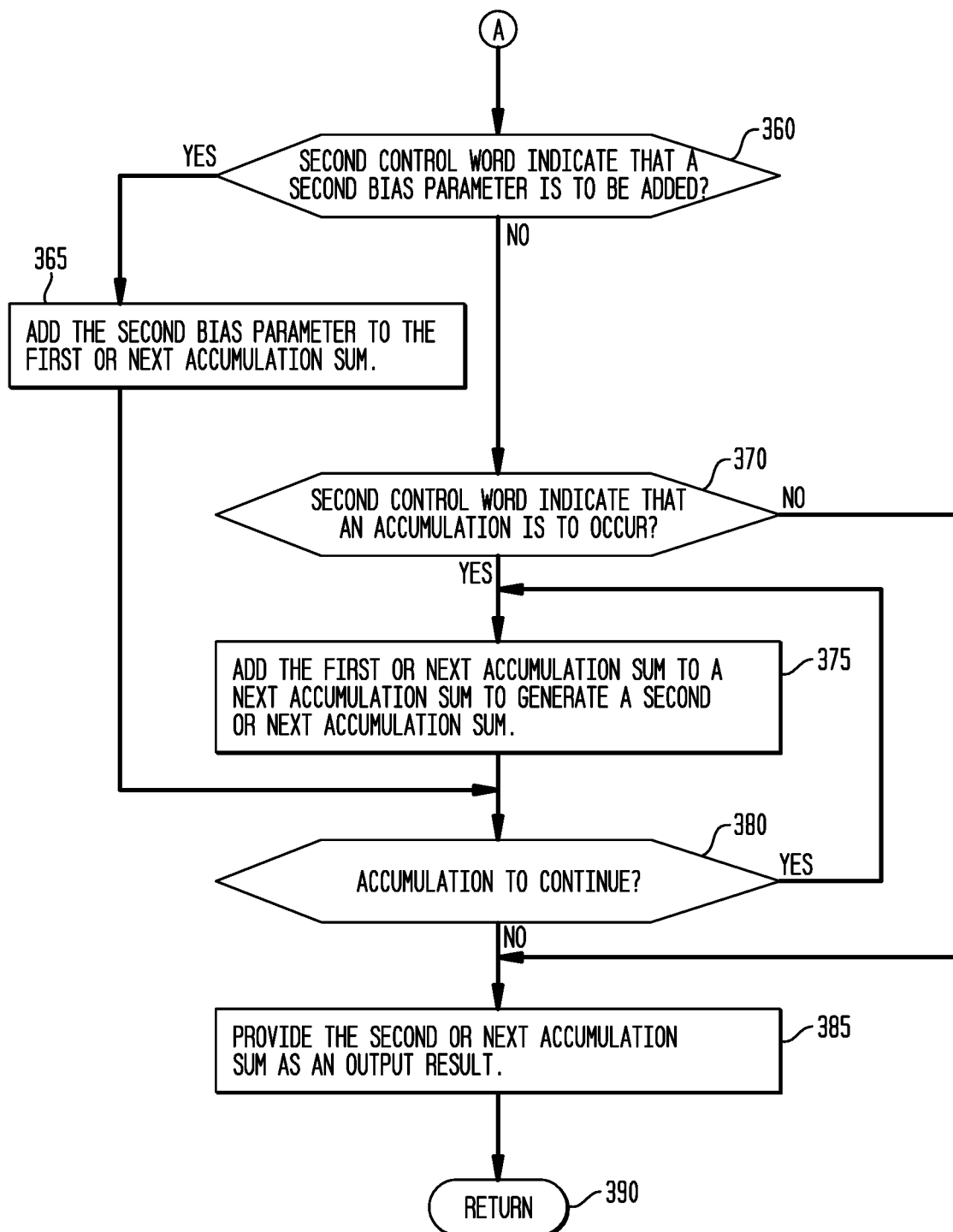

INFERENCE ENGINE CIRCUIT ARCHITECTURE

FIELD OF THE INVENTION

The present invention, in general, relates to computing circuitry, and more particularly, relates to an electronic circuit architecture capable of performing matrix-by-matrix multiplication which is useful in implementing convolutional neural networks, for applications such as artificial intelligence, machine learning, and image recognition.

BACKGROUND OF THE INVENTION

At the core of neural network operations are a large number of multiplications. Convolutional neural networks ("CNNs") are feed-forward neural networks having a plurality of interconnected, hierarchical layers, which are often utilized for a wide range of applications such as artificial intelligence, machine learning, and image recognition. The inputs and outputs of a CNN layers are typically three-dimensional ("3D"). For example, a typical CNN may use an image input having red, green, and blue channels, each of which is a separate two-dimensional (2D) input feature map. Two-dimensional convolutions are performed on each of these input feature maps to produce three outputs, which are then combined additively, pixel-by-pixel, to produce multiple output maps, which are then fed as input into the next CNN layer, until a final result is produced. One set of such input data, such as an input feature map, is referred to as an input "map". The input map data is then convolved with corresponding weights, referred to as a convolutional "kernel". Accordingly, for such neural networks, the most atomic operation is a multiplication between inputs (maps) and weights (kernels).

To run the deep learning applications typically used by a consumer, such as tagging photos in Facebook, or asking Alexa a question, or translating a language to another in Google, computers have to perform a large number of such multiplication of inputs or neural activations with weights. Neural networks use a huge number of weight parameters, as many as 150 million, and more typically between 30-60 million weights. This means that a neural network has to perform millions of multiplications for every input, every time it is used. And it should do so as fast as practicable, as people typically prefer not to wait or will not wait longer than about 200 milliseconds for a result.

Accordingly, there is an ongoing need for a computing architecture (an "engine") capable of providing high performance for CNN applications, for applications such as artificial intelligence, machine learning, image recognition, and other inferential applications requiring mathematical computations, for example and without limitation. Such a computing architecture should have a comparatively high efficiency, with significant utilization, and should have a comparatively low bandwidth for access to any memory integrated circuit storing the maps and kernel data. To provide such performance, such a computing architecture should be capable of performing a complete matrix-by-matrix multiplication.

SUMMARY OF THE INVENTION

As discussed in greater detail below, the representative apparatus (circuit) and system (integrated circuit or "IC") provide for an inference engine circuit architecture. The representative inference engine circuit architecture, as a system, is a computing architecture capable of providing high performance for CNN applications, for applications such as artificial intelligence, machine learning, image recognition, and other inferential applications requiring mathematical computations, for example and without limitation. The inference engine circuit architecture (or system) has comparatively high efficiency, with significant utilization (about 95%), and has a comparatively low bandwidth for access to any memory integrated circuit storing the maps and kernel data. The inference engine circuit architecture system is capable of performing a complete matrix-by-matrix multiplication.

The inference engine circuit architecture system reaches 99.9% efficiency in a large majority of deep neural network layers, eliminating unused circuitry (dead or "dark" silicon) and providing highly efficient power consumption, especially useful for mobile applications. The inference engine circuit architecture can provide significant scaling as well, as discussed in greater detail below.

A representative embodiment of an acceleration circuit architecture is disclosed which comprises: a first buffer circuit storing maps data; a first data network coupled to the first buffer circuit; a second buffer circuit storing kernel data; a second, serial data network coupled to the second buffer circuit; a first plurality of multiply and accumulate circuits arranged in a first array and coupled through the first data network to the first buffer circuit and coupled through the second, serial data network to the second buffer circuit, each multiply and accumulate circuit of the first plurality of multiply and accumulate circuits comprising: a multiplier circuit to multiply a maps datum and a kernel datum to generate a multiplicative product; and a first adder circuit coupled to the multiplier; with the acceleration circuit architecture further comprising: a shift register coupled to the first plurality of multiply and accumulate circuits; a first control multiplexer adapted to provide a selected output in response to a first mode control word, the selected output comprising a bias parameter or a first or next accumulation sum; and a second adder circuit coupled to the shift register and to the first control multiplexer, the second adder circuit adapted to add the multiplicative product to the bias parameter or to the first accumulation sum to generate a second or next accumulation sum.

In a representative embodiment, in response to a first mode control word designating an independent mode, the first control multiplexer provides the bias parameter as the selected output. In a representative embodiment, in response to a first mode control word designating a cooperative mode, the first control multiplexer provides the bias parameter as the selected output for a first cycle and provides the first or next accumulation sum as the selected output for a plurality of subsequent cycles. In a representative embodiment, in response to a first mode control word designating a combined independent and cooperative mode, the first control multiplexer provides the bias parameter as the selected output for a first cycle and provides the first or next accumulation sum as the selected output for a first plurality of subsequent cycles; and following the first plurality of subsequent cycles, the first control multiplexer provides the bias parameter as the selected output for a next cycle and provides the first or next accumulation sum as the selected output for a second plurality of subsequent cycles.

In a representative embodiment, the second, serial data network provides first kernel data to a first plurality of multiply and accumulate circuits, followed by sequentially providing the first kernel data to a second plurality of multiply and accumulate circuits.

In a representative embodiment, the acceleration circuit architecture may further comprise: a maps buffer arbiter circuit coupled to the first buffer circuit and to the first data network, the maps buffer arbiter circuit adapted to determine a conflict in accessing the first buffer circuit and in response to the conflict, to implement a priority protocol for access to the first buffer circuit. In a representative embodiment, the maps buffer arbiter circuit is further adapted to receive an address for selected maps data in the first buffer circuit and, in response, to obtain and provide the selected maps data.

In a representative embodiment, the acceleration circuit architecture may further comprise: a tensor decoder circuit coupled to the first data network, the tensor decoder circuit adapted to generate and output a sequence of addresses starting with a base address and incrementing the base address until the output address is equal to the base address plus a tensor length. In a representative embodiment, the tensor decoder circuit may further comprise: an operand collector coupled to the first data network, the operand collector adapted to transfer the output addresses to a maps buffer arbiter circuit or to the second buffer circuit, to obtain data corresponding to the output addresses, and to transfer the obtained data to the first plurality of multiply and accumulate circuits. In a representative embodiment, the acceleration circuit architecture may further comprise: a tensor buffer coupled to the tensor decoder circuit; and a control core coupled to the tensor decoder circuit and to the first data network, the control core adapted to receive and decode a plurality of instructions, and to transfer a tensor instruction to the tensor buffer for execution by the tensor decoder circuit.

In a representative embodiment, the acceleration circuit architecture may further comprise: a mode control circuit adapted to provide or generate the first mode control word.

In a representative embodiment, the acceleration circuit architecture may further comprise: a MAX circuit comprising a plurality of comparators, the plurality of comparators adapted to determine a maximum value of a plurality of second or next accumulation sums.

In another representative embodiment, the acceleration circuit architecture may further comprise: a plurality of second control multiplexers, each second control multiplexer of the plurality of second control multiplexers coupled to a first adder circuit of a multiply and accumulate circuit of the first plurality of multiply and accumulate circuits, each second control multiplexer of the plurality of second control multiplexers adapted to provide a selected output in response to a second mode control word, the selected output comprising a bias parameter or a first accumulation sum.

Another representative embodiment of an acceleration circuit architecture is disclosed which comprises: a first buffer circuit storing maps data; a first data network coupled to the first buffer circuit; a plurality of second buffer circuits storing kernel data, each second buffer circuit of the plurality of second buffer circuits storing different kernel data than another second buffer circuit of the plurality of second buffer circuits; a plurality of second, serial data networks, each second, serial data network of the plurality of second, serial data networks coupled to a corresponding second buffer circuit of the plurality of second buffer circuits; a plurality of vector-vector acceleration circuits arranged in a plurality of arrays, each vector-vector acceleration circuit of the plurality of vector-vector acceleration circuits coupled through the first data network to the first buffer circuit, and each vector-vector acceleration circuit of the plurality of vector-vector acceleration circuits of a selected array of the plurality of arrays coupled through a corresponding second, serial data network of the plurality of second, serial data networks to a second buffer circuit of the plurality of second buffer circuits, each vector-vector acceleration circuit of the plurality of vector-vector acceleration circuits comprising: a plurality of multiply and accumulate circuits, each multiply and accumulate circuit of the plurality of multiply and accumulate circuits comprising: a multiplier circuit to multiply a maps datum and a kernel datum to generate a multiplicative product; and a first adder circuit coupled to the multiplier; with each vector-vector acceleration circuit further comprising a shift register coupled to the plurality of multiply and accumulate circuits; a first control multiplexer adapted to provide a selected output in response to a first mode control word, the selected output comprising a bias parameter or a first or next accumulation sum; and a second adder circuit coupled to the shift register and to the first control multiplexer, the second adder circuit adapted to add the multiplicative product to the bias parameter or to the first accumulation sum to generate a second or next accumulation sum.

In a representative embodiment, each second, serial data network of the plurality of second, serial data networks provides first kernel data to a first vector-vector acceleration circuit, followed by sequentially providing the first kernel data to a second vector-vector acceleration circuit of the selected array of the plurality of arrays.

In a representative embodiment, a first serial data network of the plurality of second, serial data networks provides first kernel data to a first array of vector-vector acceleration circuits and a second serial data network of the plurality of second, serial data networks provides second kernel data to a second array of vector-vector acceleration circuits, the first kernel data different than the second kernel data.

Another representative embodiment of an acceleration circuit architecture is disclosed which comprises: a memory interface circuit; a first buffer circuit storing maps data; a first data network coupled to the first buffer circuit and to the memory interface circuit; a plurality of second buffer circuits storing kernel data, each second buffer circuit of the plurality of second buffer circuits storing different kernel data than another second buffer circuit of the plurality of second buffer circuits; a plurality of second, serial data networks, each second, serial data network of the plurality of second, serial data networks coupled to a corresponding second buffer circuit of the plurality of second buffer circuits; at least one matrix-matrix acceleration circuit having a plurality of operating modes, the plurality of operating modes comprising an independent mode, a cooperative mode, and a plurality of combined independent and cooperative modes, the at least one matrix-matrix acceleration circuit comprising: a plurality of matrix-vector acceleration circuits, each matrix-vector acceleration circuit of the plurality of matrix-vector acceleration circuits comprising an array of a plurality of vector-vector acceleration circuits, each matrix-vector acceleration circuit of the plurality of matrix-vector acceleration circuits coupled through the first data network to the first buffer circuit, and each matrix-vector acceleration circuit of the plurality of matrix-vector acceleration circuits coupled through a corresponding second, serial data network of the plurality of second, serial data networks to a different second buffer circuit of the plurality of second buffer circuits, each vector-vector acceleration circuit of the plurality of vector-vector acceleration circuits comprising: a plurality of multiply and accumulate circuits, each multiply and accumulate circuit of the plurality of multiply and accumulate circuits comprising: a multiplier circuit to multiply a maps datum and a kernel datum to generate a multiplicative product; and a first adder circuit coupled to the multiplier; a shift register coupled to the plurality of multiply and accumulate circuits; a control multiplexer adapted to provide a selected output in response to a mode control word corresponding to a selected operating mode of the plurality of operating modes, the selected output comprising a bias parameter or a first or next accumulation sum; and a second adder circuit coupled to the shift register and to the first control multiplexer, the second adder circuit adapted to add the multiplicative product to the bias parameter or to the first accumulation sum to generate a second or next accumulation sum and to provide the second or next accumulation sum as an output corresponding to the selected operating mode; and further comprising: a MAX circuit comprising a plurality of comparators, the plurality of comparators adapted to determine a maximum value of a plurality of second or next accumulation sums.

A representative embodiment of a method of accelerating a matrix multiplication is also disclosed, with the method comprising: selecting an operating mode; obtaining maps data; obtaining kernel data; obtaining a mode control word; using a multiplier circuit, multiply maps data and kernel data to generate a multiplicative product; when the mode control word indicates that an accumulation is to occur, using an adder circuit, add the multiplicative product to a first or next accumulation sum to generate a next accumulation sum; when the mode control word indicates that a first bias parameter is to be added, using an adder circuit, add the first bias parameter to the multiplicative product or to the next accumulation sum; and outputting the next accumulation sum. In a representative embodiment, the multiplication and accumulation steps continue until a complete matrix multiplication has occurred.

In a representative embodiment, in response to a mode control word designating an independent mode, the method provides a plurality of next accumulation sums as a plurality of separate outputs. In such a representative embodiment, the method may further comprise: adding the bias parameter for a first cycle; adding the first or next accumulation sum for a plurality of subsequent cycles to generate the next accumulation sum; and outputting the next accumulation sum as a separate output of the plurality of outputs.

In another representative embodiment, the method may further comprise: adding the bias parameter for a first cycle; adding the first or next accumulation sum for a plurality of subsequent cycles to generate the next accumulation sum; in response to a mode control word designating a combined independent and cooperative mode, adding together a predetermined number of next accumulation sums to generate an output accumulation sum; and successively outputting the output accumulation sum as a separate output of the plurality of outputs.

In another representative embodiment, the method may further comprise: in response to a mode control word designating a cooperative mode, providing a single accumulation sum as an output. In such a representative embodiment, the method may further comprise: adding the bias parameter for a first cycle; adding the first or next accumulation sum for a plurality of subsequent cycles to generate the next accumulation sum; and adding together all next accumulation sums to generate the single accumulation sum.

In various representative embodiments, the method may further comprise: generating and outputting a sequence of addresses starting with a base address and incrementing the base address until the output address is equal to the base address plus a tensor length.

Numerous other advantages and features of the present invention will become readily apparent from the following detailed description of the invention and the embodiments thereof, from the claims and from the accompanying drawings.

BRIEF DESCRIPTION OF THE DRAWINGS

The objects, features and advantages of the present invention will be more readily appreciated upon reference to the following disclosure when considered in conjunction with the accompanying drawings, wherein like reference numerals are used to identify identical components in the various views, and wherein reference numerals with alphabetic characters are utilized to identify additional types, instantiations or variations of a selected component embodiment in the various views, in which:

FIGS. 10A and 10B (collectively referred to as FIG. 10) is a flow chart of a representative embodiment of a method of performing matrix multiplication using the inference engine circuit architecture or system.

DETAILED DESCRIPTION OF REPRESENTATIVE EMBODIMENTS

Figure 1:
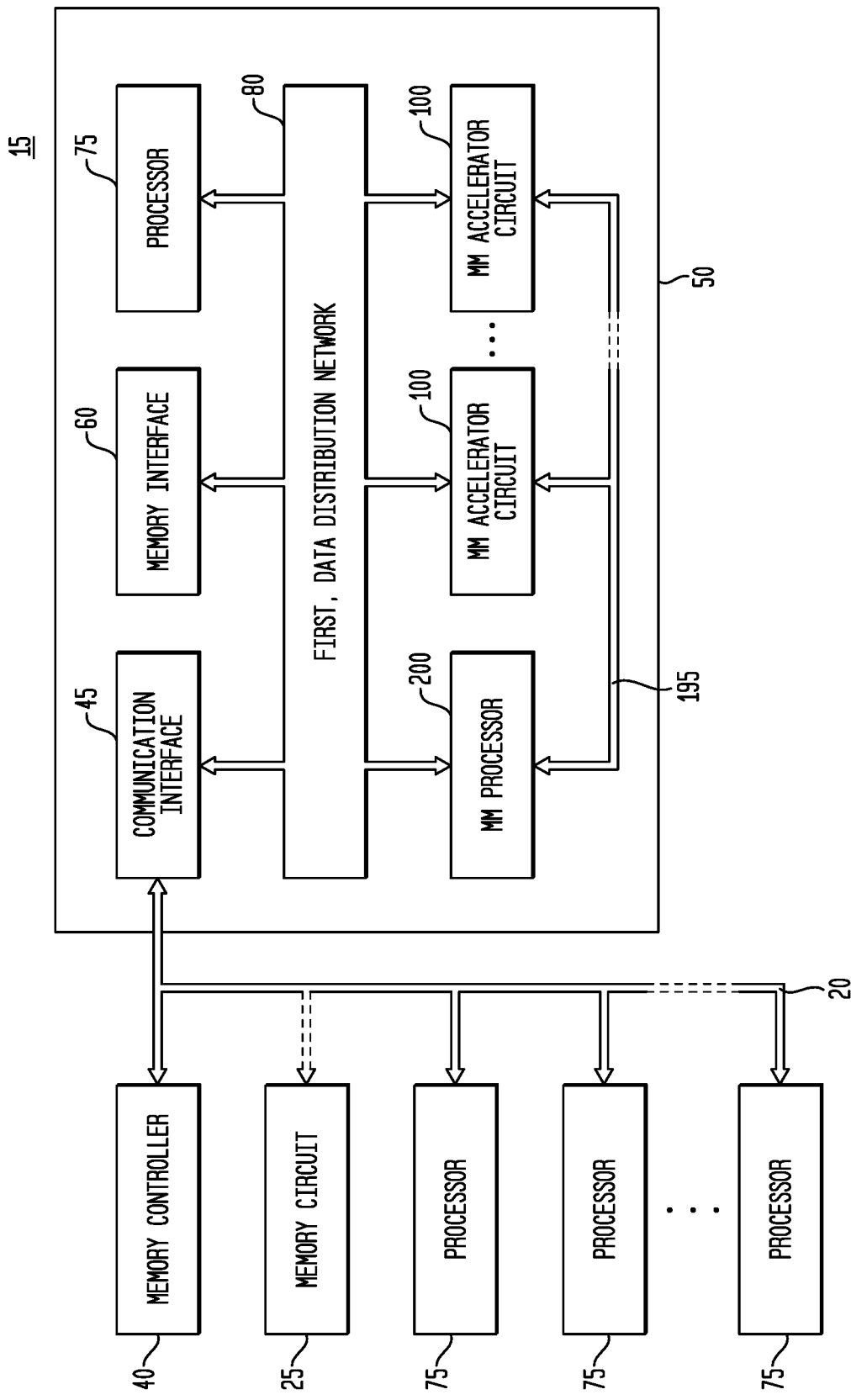
FIG. 1 is a block diagram of a representative embodiment of an inference engine circuit architecture or system having a matrix-matrix ("MM") processor circuit one or more matrix-matrix ("MM") accelerator circuits.

While the present invention is susceptible of embodiment in many different forms, there are shown in the drawings and will be described herein in detail specific exemplary embodiments thereof, with the understanding that the present disclosure is to be considered as an exemplification of the principles of the invention and is not intended to limit the invention to the specific embodiments illustrated. In this respect, before explaining at least one embodiment consistent with the present invention in detail, it is to be understood that the invention is not limited in its application to the details of construction and to the arrangements of components set forth above and below, illustrated in the drawings, or as described in the examples. Methods and apparatuses consistent with the present invention are capable of other embodiments and of being practiced and carried out in various ways. Also, it is to be understood that the phraseology and terminology employed herein, as well as the abstract included below, are for the purposes of description and should not be regarded as limiting.

FIG. 1 is a block diagram of a representative embodiment of an inference engine circuit architecture (or system) 50 comprising a matrix-matrix (MM) processor circuit 200 and one or more matrix-matrix (MM) accelerator circuits 100. The inference engine circuit architecture 50, as a system, further comprises a memory interface 60 for read (load) and write (store) access to a memory circuit 25, which access may be through a memory controller 40 optionally. As another option, the inference engine circuit architecture 50 may also comprise a general purpose processor 75, which may be any type or kind of processor as described in greater detail below, such as a microprocessor, for performing computations and/or executing control code which are not being performed or executed by the MM processor circuit 200 and the one or more MM accelerator circuits 100. The inference engine circuit architecture 50 also typically includes a communication interface (or other input-output interface) 45, described in greater detail below, for communication between the inference engine circuit architecture 50 and other, typically off-chip components which may be part of a larger system or board 15 (e.g., a rack-mounted board of a server, for example and without limitation), such as the memory circuit 25 (via a communication bus 20, which may have any type of kind of communication bus structure, for example and without limitation). In a representative embodiment, the communication interface 45 includes the functionality of the memory interface 60, or vice-versa, and only one such memory interface 60 or communication interface (or other input-output interface) 45 is included in the inference engine circuit architecture (or system) 50.

In a representative embodiment, the inference engine circuit architecture 50 is embodied as an integrated circuit, such as an application specific integrated circuit ("ASIC") or a field programmable gate array ("FPGAs"). A memory controller 40 optionally may be included as part of the inference engine circuit architecture 50 or system 15. The memory circuit 25 is typically embodied as a separate IC. Depending upon the embodiment, the inference engine circuit architecture 50 may also be coupled to additional processors 75, such as via the communication bus 20.

The MM processor circuit 200, the one or more MM accelerator circuits 100, the memory interface 60 and the processor 75 are typically coupled to each other over a first, data distribution network 80 (and/or first, data distribution network 80A, illustrated in and discussed below with reference to FIG. 4). The first, data distribution network 80, 80A is for data transfer and other communication, such as for data transfer from the memory circuit 25 through the communication interface 45, such as for reading and obtaining maps and kernel data, and for data transfer from the MM processor circuit 200 and one or more MM accelerator circuits 100 for storage in the memory circuit 25, also via the communication interface 45. The first, data distribution network 80 is also utilized for data transfer between or among the one or more of MM accelerator circuits 100, and optionally for data transfer between or among the MM processor circuit 200 and the one or more MM accelerator circuits 100. The first, data distribution network 80, 80A can implement one or more priority protocols to determine which data is transferred when and in what order, such as a round-robin protocol or a hierarchical priority in which various components have a higher priority for data transmission or reception, such as providing a higher priority to the MAC circuits 190, followed by a MAX circuit 130 as next in priority, followed by a load operation from the memory circuit 25 as next in priority, etc., and any and all such variations are considered equivalent and within the scope of the disclosure. In a representative embodiment, the MM processor circuit 200 optionally may also have a separate control bus or network 195 for data and control communication with the one or more MM accelerator circuits 100. In another representative embodiment, the first, data distribution network 80 also may be combined with the second, data access network 110, discussed below, as a first, data distribution network 80A illustrated in FIG. 4. When a separate control bus 195 is not implemented, control information also may be distributed via the first, data distribution network 80 and the second, data access network 110 and/or first, data distribution network 80A, any and all such variations are considered equivalent and within the scope of the disclosure.

Figure 2:
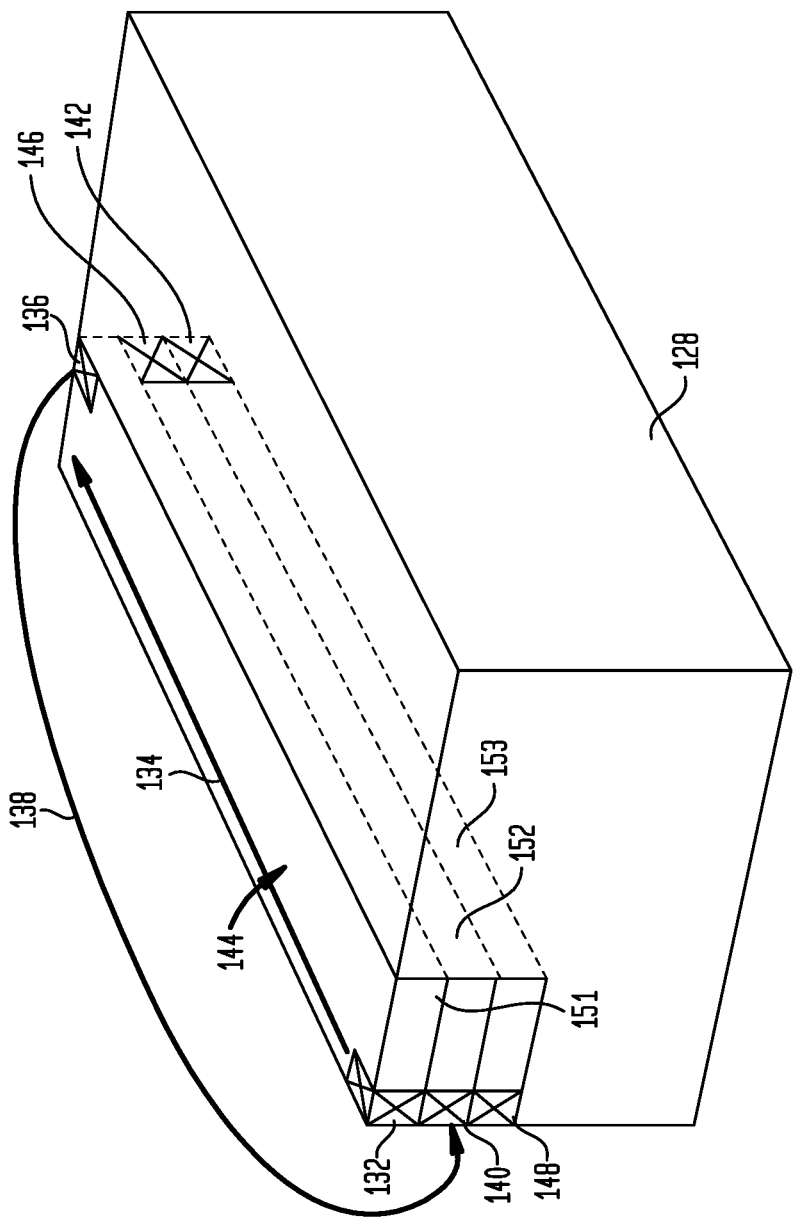
FIG. 2 is a schematic diagram of three-dimensional volume of maps or kernel data used in a representative embodiment of an inference engine circuit architecture system.

FIG. 2 is a schematic diagram of three-dimensional volume of maps or kernel data 128 used in a representative embodiment of an inference engine circuit architecture 50. The inference engine circuit architecture 50 implements a "tensor" construct, in which data operation may be performed across a three-dimensional volume of non-contiguous data, and not merely a series of adjacent vectors of data. The tensor decoder 250 of the MM processor circuit 200 and/or MM accelerator circuits 100 can process a single instruction to read such a volume of data, tensor 144, given a start address 132, a depth 134 (for obtaining data in a "depth first" pattern), a stride 138 from a second or end address 136 of the first data plane 151 to the next non-contiguous data start address 140 of the second or next data plane 152, and continuing through the last or end address 142, bringing in multiple planes 151, 152, and 153 of maps or kernel data of the selected tensor 144, as illustrated in FIG. 2. It should be noted that the stride for proceeding from address 146 to 148 is the same as the stride 138. This use of tensor data is helpful in diminishing or minimizing the bandwidth requirements for obtaining data from the memory circuit 25, for example. As illustrated in FIG. 2, the length of the tensor 144 comprises the combined lengths of all of the data in each such data plane, i.e., the length of all of the data vectors from start address 132 to the last or end address 136 of the first data plane 151 of the tensor 144, plus the length of all of the data vectors from start address 140 to the last or end address 146 of the second data plane 152 of the tensor 144, plus the length of all of the data vectors from start address 148 to the last or end address 142 of the third data plane 153 of the tensor 144.

Figure 3:
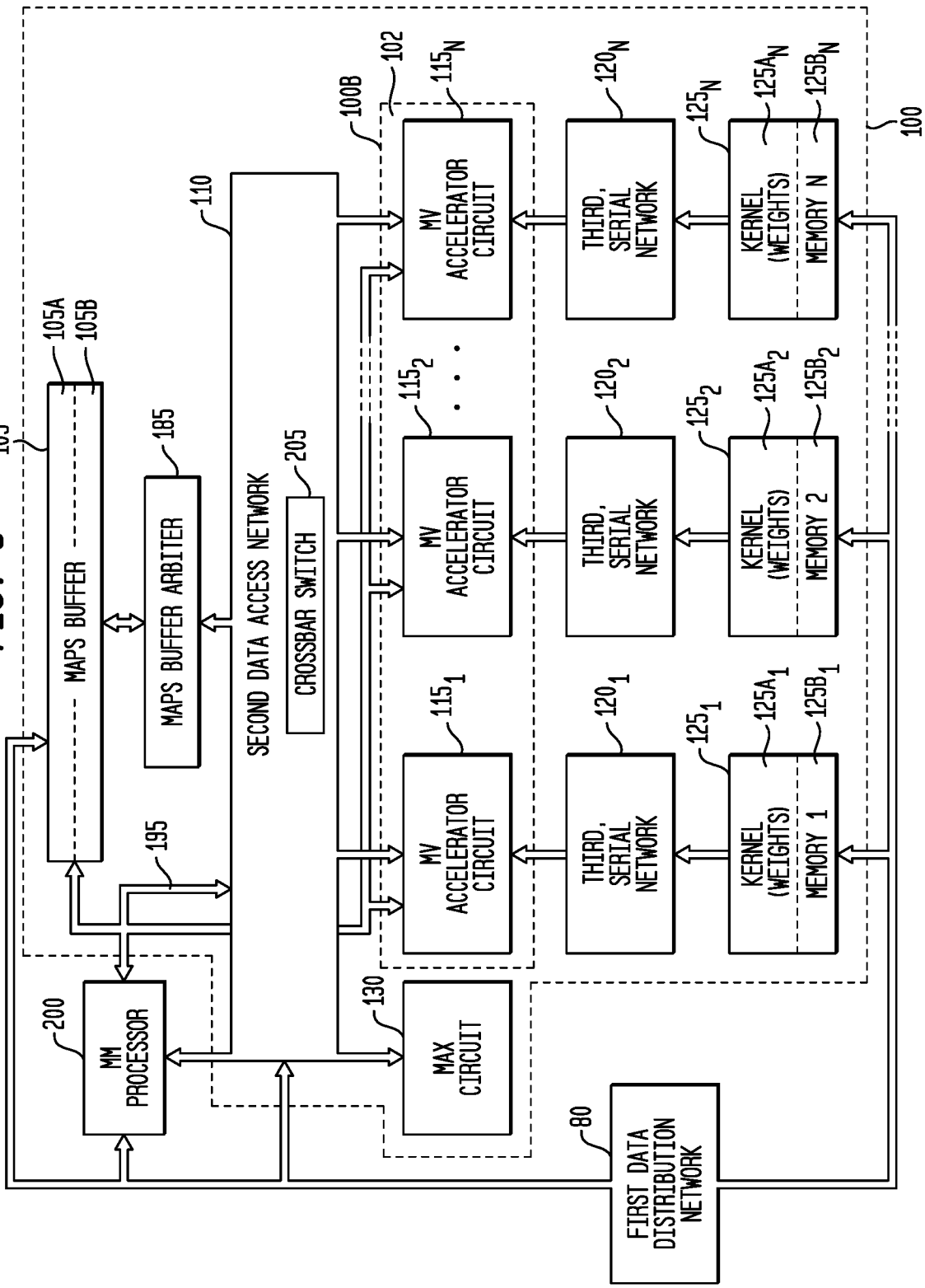
FIG. 3 is a block diagram of a representative first embodiment of a matrix-matrix accelerator circuit having a plurality of matrix-vector ("MV") accelerator circuits.

FIG. 3 is a block diagram of a representative first embodiment of a MM accelerator circuit 100 having a plurality of matrix-vector (MV) accelerator circuits 115 and at least one MAX circuit 130. FIG. 4 is a block diagram of a representative second embodiment of a MM accelerator circuit 100A having a plurality of MV accelerator circuits and at least one MAX circuit 130. The first and second embodiments of the MM accelerator circuit 100, 100A differ only insofar as in the MM accelerator circuit 100A, the functionality of the first, data distribution network 80 and the functionality of the second, data access network 110 have been combined into a singular first, data distribution network 80A, which functions identically to the separate first, data distribution network 80 as described above combined with the functionality of the second, data access network 110 described below. Alternatively, also illustrated in FIGS. 3 and 4, an MM accelerator circuit 100B can also be considered to comprise merely an array 102 of a plurality of MV accelerator circuits 115, as a third embodiment, and if so, then the inference engine circuit architecture 50 will be considered to comprise and include the other components (105, 185, 110 or 80A, 205, 120, 125, 130) illustrated in FIGS. 3 and 4 for MM accelerator circuits 100, 100A.

Figure 4:
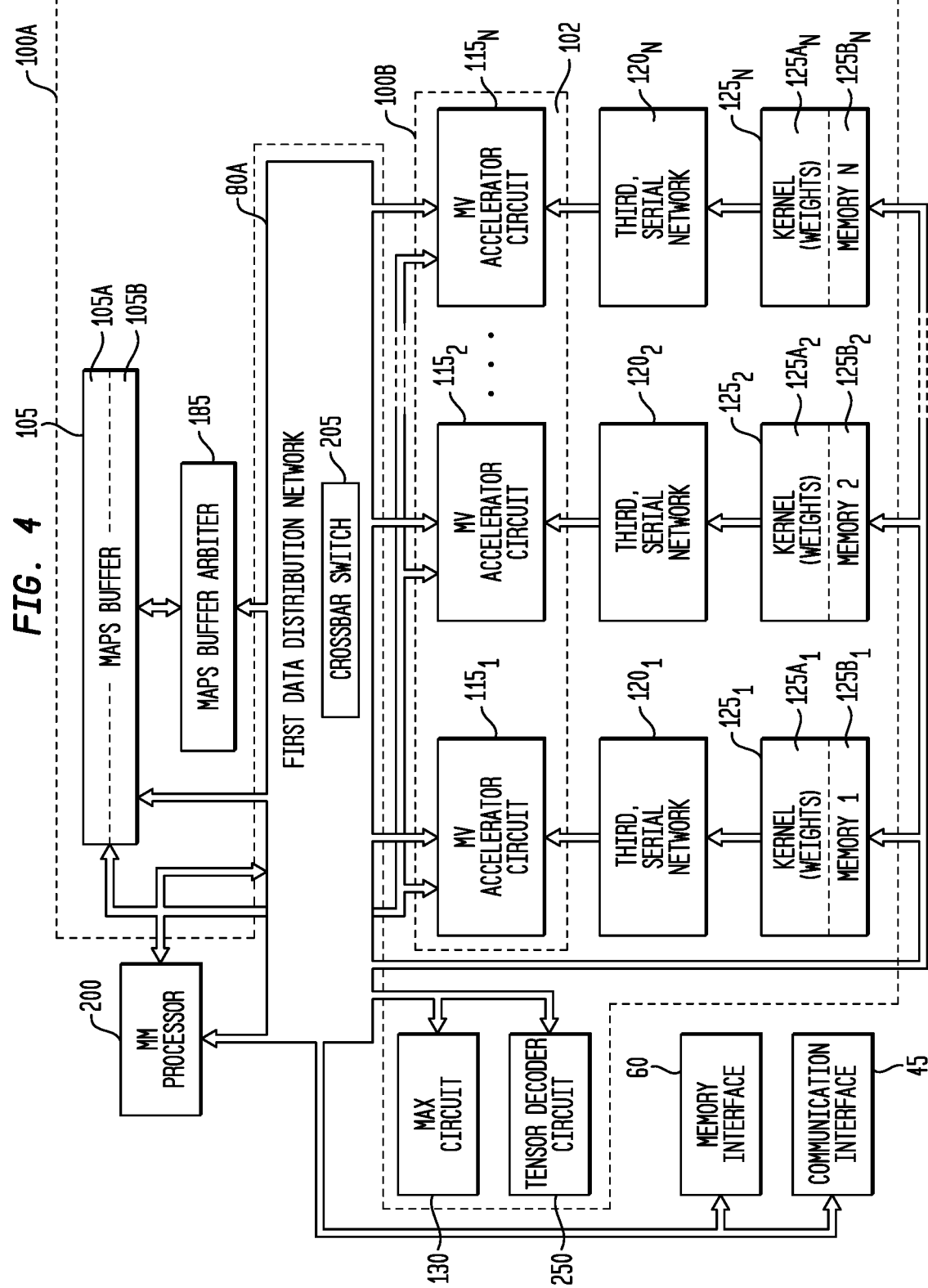
FIG. 4 is a block diagram of a representative second embodiment of a matrix-matrix accelerator circuit having a plurality of matrix-vector (MV) accelerator circuits.

As illustrated in FIGS. 3 and 4, the MM accelerator circuit 100 includes a MAX circuit 130 and a number "N" of MV accelerator circuits 115, illustrated as MV accelerator circuit $115_1$, MV accelerator circuit $115_2$, through MV accelerator circuit $115_N$. Each MM accelerator circuit 100 is structured or adapted to perform a complete multiplication of a first matrix ("A") by another, second matrix ("B") (C=A*B), using a plurality of MV accelerator circuits 115, each of which is structured or adapted to perform a complete multiplication of the first matrix by one of the vectors comprising the second matrix (c=A*b). The MAX circuit 130 is comprised of a plurality of comparators 280 (illustrated in FIG. 9), and is utilized to obtain a maximum of the operands being compared, such as to implement a maxpooling operation of a CNN as part of the functions of the MM accelerator circuit 100.

The MV accelerator circuits 115 are coupled to each other and to a maps (operand data) buffer (or other memory or registers) 105 over the second, data access network 110 (or first, data distribution network 80A), and each MV accelerator circuit 115 has access to all of the maps data stored in the maps buffer 105. The maps buffer 105 may be implemented as any type of buffer, memory or registers, and stores maps data, which may have been obtained from the memory circuit 25 or which may have other maps data which has been stored as results following computations from the various MAC circuits 190 and/or MAX circuit 130. The maps buffer 105 is typically divided into separate banks (not separately illustrated), which may be accessed separately by the physical links of the second, data access network 110 (or first, data distribution network 80A). In a representative embodiment, the maps buffer 105 implements double-buffering, illustrated as maps buffer 105A and maps buffer 105B, so data may be pre-fetched or written into a first part of the maps buffer 105, as maps buffer 105A, while data is being read from a second part of the maps buffer 105, as maps buffer 105B, and vice-versa, reducing latency in obtaining maps data for computations or other processing. In such an embodiment, the MV accelerator circuits 115 will alternate or "ping-pong" between the maps buffer 105A and the maps buffer 105B of the double-buffered maps buffer 105 to obtain or store the corresponding maps data.

In addition, the second, data access network 110 (operating at a double data rate (DDR)) typically also performs the functions described above for the first, data distribution network 80, also functioning as a data highway, implementing priority protocols, controlling the data load and bandwidth, gathering data to write to one or more data vectors to the memory circuit 25, and controlling read and write operations from and to the maps buffer 105 and kernel buffers 125.

Each of the MV accelerator circuits 115 is also coupled, via a third, serial network 120, to separate a kernel (weights) buffer (or other memory or registers) 125, illustrated as kernel buffer $125_1$ coupled via third, serial network $120_1$ to the MV accelerator circuit $115_1$, kernel buffer $125_2$ coupled via third, serial network $120_2$ to the MV accelerator circuit $115_2$, through kernel buffer 125N coupled via third, serial network 120N to the MV accelerator circuit $115_N$. The third, serial network 120 is discussed in greater detail below with reference to FIG. 5. The kernel buffers 125 may be implemented as any type of buffer, memory or registers, and each stores kernel (weights) data, which may have been obtained from the memory circuit 25. The kernel buffers 125 also may implement double-buffering, as previously described, so kernel (weights) data may be pre-fetched or written into a first part of the kernel buffer 125, as kernel buffer 125A, while kernel (weights) data is being read from a second part of the kernel buffer 125, as kernel buffer 125B, and vice-versa, also reducing latency in obtaining kernel (weights) data for computation and other processing (illustrated as kernel buffer $125A_1$, kernel buffer $125B_1$, kernel buffer $125A_2$, kernel buffer $125B_2$, through kernel buffer $125A_N$, and kernel buffer $125B_N$. For this representative embodiment, each MV accelerator circuit 115 has access only to the kernel (weights) data of the corresponding kernel buffer 125 to which it is coupled via the third, serial network 120, e.g., MV accelerator circuit $115_1$ accesses only the kernel data in the corresponding kernel buffer $125_1$ via the corresponding third, serial network $120_1$. In a first mode, each of the kernel buffers 125 contain different kernel (weights) data for use in the various computations (using the same maps data), while in a second mode, each of the kernel buffers 125 contain the same kernel (weights) data for use in the various computations (using different maps data or different parts of the same maps data). As a result, in the multiplication process performed by the MV accelerator circuits 115, all of the relevant maps data of the maps buffer 105 will be multiplied by all of the different kernel (weights) data held in the kernel buffers 125, without repeating a computation, for example, by not repeating a multiplication of maps data with the same kernel data in an MV accelerator circuit 115 that has already been utilized by another MV accelerator circuit 115.

Higher performance of the inference engine circuit architecture 50 has been achieved using the maps buffer 105, which is global to a MV accelerator circuit 115), and separate kernel buffers 125, each of which is specific to a single MV accelerator circuit 115 (including its array of VV accelerator circuits 150).

In a representative embodiment, the second, data access network 110 is comprises a crossbar switch 205 together with any selected bus structure, which may be embodied in any of a wide variety of ways (e.g., as a folded CLOS configuration, for example and without limitation), any and all of which are considered equivalent and within the scope of the disclosure. The second, data access network 110 and/or first, data distribution network 80A provides for each vector-vector (VV) accelerator circuit 150 of each MV accelerator circuit 115 to have complete read (load) and write (store) access to all of the maps data in the entire maps buffer 105. For example, each VV accelerator circuit 150 of each MV accelerator circuit 115 has its own physical links to the memory banks of the maps buffer 105, via the second, data access network 110 (or first, data distribution network 80A). To avoid conflict, a maps buffer arbiter circuit 185 is included, either as a separate component or within the second, data access network 110 and/or first, data distribution network 80A, or alternatively within the maps buffer 105, for example and without limitation. As mentioned above, in the second representative embodiment, first, data distribution network 80A includes the functionality of the second, data access network 110, such that the crossbar switch 205 is implemented between all of the VV accelerator circuits 150 and the maps buffer 105, and that the maps buffer arbiter circuit 185 is included (e.g., separately, or within the first, data distribution network 80A, or within the maps buffer 105, or within the MM accelerator circuit 100, 100A more generally, for example and without limitation), and any and all such variations are considered equivalent and within the scope of the disclosure.

It should also be noted that when a first, data distribution network 80A is implemented, combining the functionality of the first, data distribution network 80 and the second, data access network 110 into the first, data distribution network 80A, then the third, serial network 120 may be referred to equivalently as a second, serial network 120 or more simply as a serial network 120.

Each of the MV accelerator circuits 115 is also coupled to the MM processor circuit 200, to receive control information, such as to determine the operational mode of the MV accelerator circuit 115 and/or VV accelerator circuits 150. As discussed in greater detail below, in a first embodiment, the MM processor circuit 200 includes a tensor decoder circuit 250. In a second representative embodiment, illustrated in FIG. 4, each MM accelerator circuit 100 includes separate a tensor decoder circuit 250 (which is then no longer included within the MM processor circuit 200), such that multiple tensor decoder circuits 250 may be implemented and distributed within the inference engine circuit architecture 50, for example and without limitation. In another representative embodiment, not separately illustrated, other components of the MM processor circuit 200 (such as an operand collector 260 or a mode control circuit 255 discussed below) also may be duplicated and distributed within the inference engine circuit architecture 50, such that each MM accelerator circuit 100 includes a separate such component (which is then no longer included within the MM processor circuit 200), also for example and without limitation. Any and all such variations are considered equivalent and within the scope of the disclosure.

It should also be noted that for any of these various first and second (or third) embodiments of the MM accelerator circuit 100, 100A, the various components may be clustered or included, or not included, in a wide variety of ways, each of which is considered equivalent and within the scope of the disclosure. For example and without limitation, as another alternative, an MM accelerator circuit 100, 100A may be considered to comprise an array of the plurality of MV accelerator circuits 115 and the at least one MAX circuit 130, with all other components (such as the maps buffer 105, the kernel buffers 125, the second, data access network 110, the tensor decoder circuit 250, etc.) considered to be part of a larger "cluster" circuit configuration such as the system 50. Also for example and without limitation, as another alternative, an MV accelerator circuit 115 may be considered to comprise an array of a plurality of VV accelerator circuits 150 and the at least one MAX circuit 130, with all other components (such as the maps buffer 105, the kernel buffers 125, the second, data access network 110, the tensor decoder circuit 250, etc.) considered to be part of a larger "cluster" circuit configuration such as the MM accelerator circuit 100. Any and all of these various combinations and permutations are considered equivalent and within the scope of the disclosure.

Figure 5:
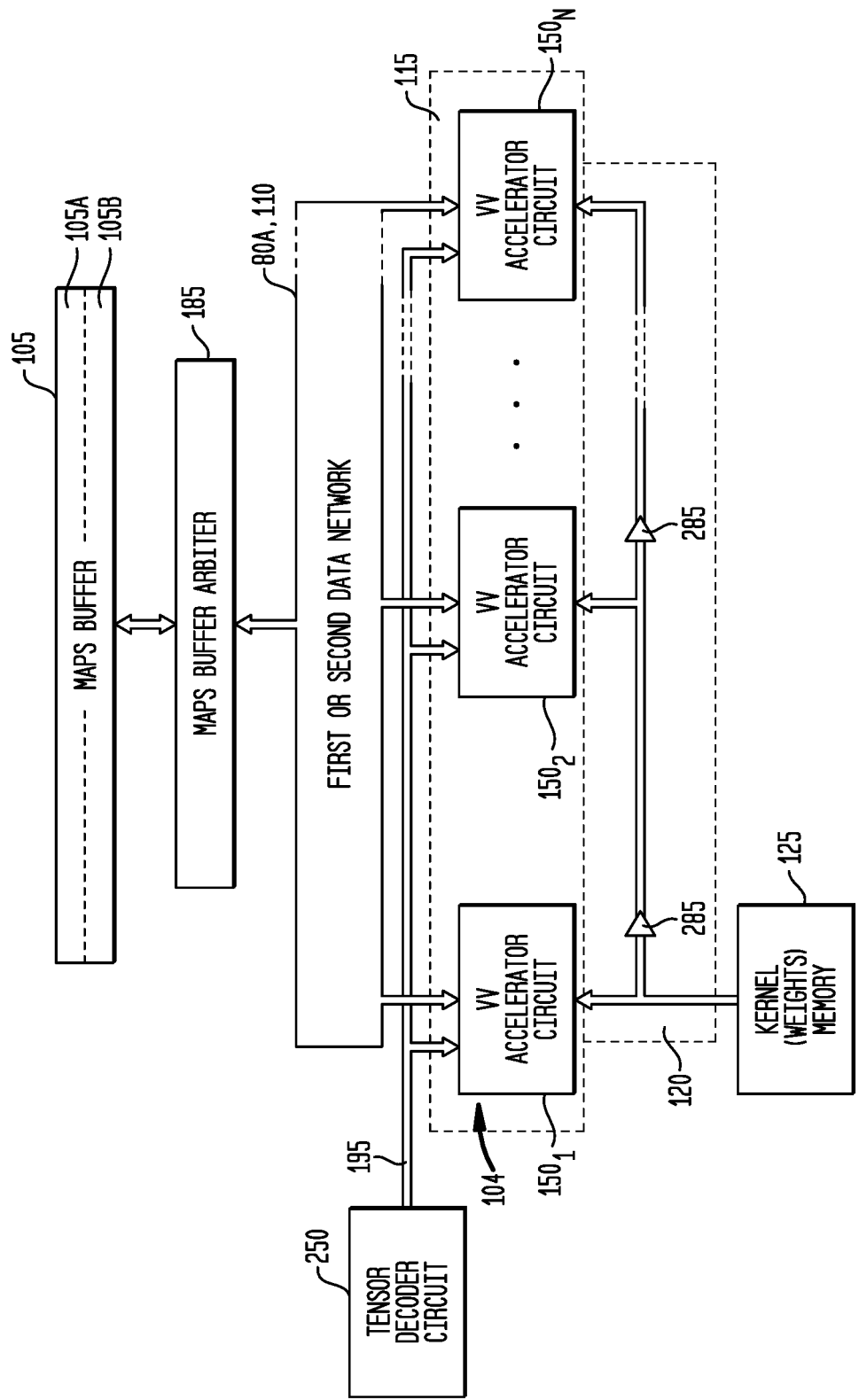
FIG. 5 is a block diagram of a representative embodiment of a matrix-vector accelerator circuit having a plurality of vector-vector ("VV") accelerator circuits.

FIG. 5 is a block diagram of a representative embodiment of a matrix-vector (MV) accelerator circuit 115 having an array 104 of a plurality of vector-vector (VV) accelerator circuits 150, illustrated as VV accelerator circuit $150_1$, VV accelerator circuit $150_2$, VV accelerator circuit $150_3$, through VV accelerator circuit $150_N$. Each of the VV accelerator circuits 150 are coupled to each other and to a maps (operand data) buffer (or other memory or registers) 105 over the second, data access network 110 and/or first, data distribution network 80A, and each VV accelerator circuit 150 has access to all of the maps data stored in the maps buffer 105, as described above. With each MM accelerator circuit 100 structured or adapted to perform a complete multiplication of a first matrix by another, second matrix to produce a resulting matrix "C" (C=A*B), using a plurality of MV accelerator circuits 115, and each MV accelerator circuit 115 of a selected MM accelerator circuit 100 structured or adapted to perform a complete multiplication of the first matrix by one of the vectors comprising the second matrix (c=A*b), and in turn, each VV accelerator circuit 150 of a selected MV accelerator circuits 115 is structured or adapted to perform a complete multiplication of one or the vectors comprising the first matrix by one of the vectors comprising the second matrix (c=a*b).

In addition to performing a vector multiplication, the array of VV accelerator circuits 150 (forming a MV accelerator circuit 115) can implement any numerical function via piecewise linear approximation and also provide counting, pointers and group operations such as averaging, computation of least and most value. These VV accelerator circuits 150 provide all the atomic operations needed to compute virtually any neural network layer, for example and without limitation.

Each of the VV accelerator circuits 150 of a single MV accelerator circuit 115 is also coupled, via a corresponding third, serial network 120, to a corresponding kernel (weights) buffer (or other memory or registers) 125, as mentioned above. The kernel (weights) data from the kernel (weights) buffer 125 is transferred to a first VV accelerator circuit $150_1$, then sequentially transferred to the next VV accelerator circuit $150_2$, such as by using a buffer (driver, amplifier or other data transfer) circuit 285 (for example and without limitation), and so on, with the kernel (weights) data propagating within a few clock cycles over the third, serial network 120 to all of the VV accelerator circuits 150 of the given MV accelerator circuit 115. This use of the third, serial network 120 significantly increases efficiency, without any significant increase in latency, and further reduces the size (area), power consumption, and fanout of the bus structure forming the third, serial network 120, particularly compared to any network or bus structure which would provide the kernel data in parallel to all of the VV accelerator circuits 150 of an MV accelerator circuit 115 or entire MM accelerator circuit 100. As mentioned above, when a first, data distribution network 80A is implemented, the third, serial network 120 may be referred to equivalently as a second, serial network 120 or more simply as a serial network 120. It is irrelevant if any of these communication networks or busses is referred to as first, second, or third, for example. Rather, what is significant is that a separate serial network 120 is utilized to couple each VV accelerator circuit 150 to a corresponding kernel (weights) buffer 125, while a more global network (the first, data distribution network 80 and the second, data access network 110 or the first, data distribution network 80A) is utilized to couple the VV accelerator circuits 150 to the maps buffer 105 for more global sharing of maps data.

Each of the VV accelerator circuits 150 is also coupled to the MM processor circuit 200 or tensor decoder circuit 250 to receive control information, such as to determine the operational mode of the VV accelerator circuit 150, using a mode control word, such as via the control bus 195 as illustrated or via the first, data distribution network 80, 80A and/or the second, data access network 110. As discussed in greater detail below, these operational modes include an independent mode, a cooperative mode, and several combined or blended cooperative and independent modes, each of which generates different sequences of outputs from each VV accelerator circuit 150.

Figure 6:
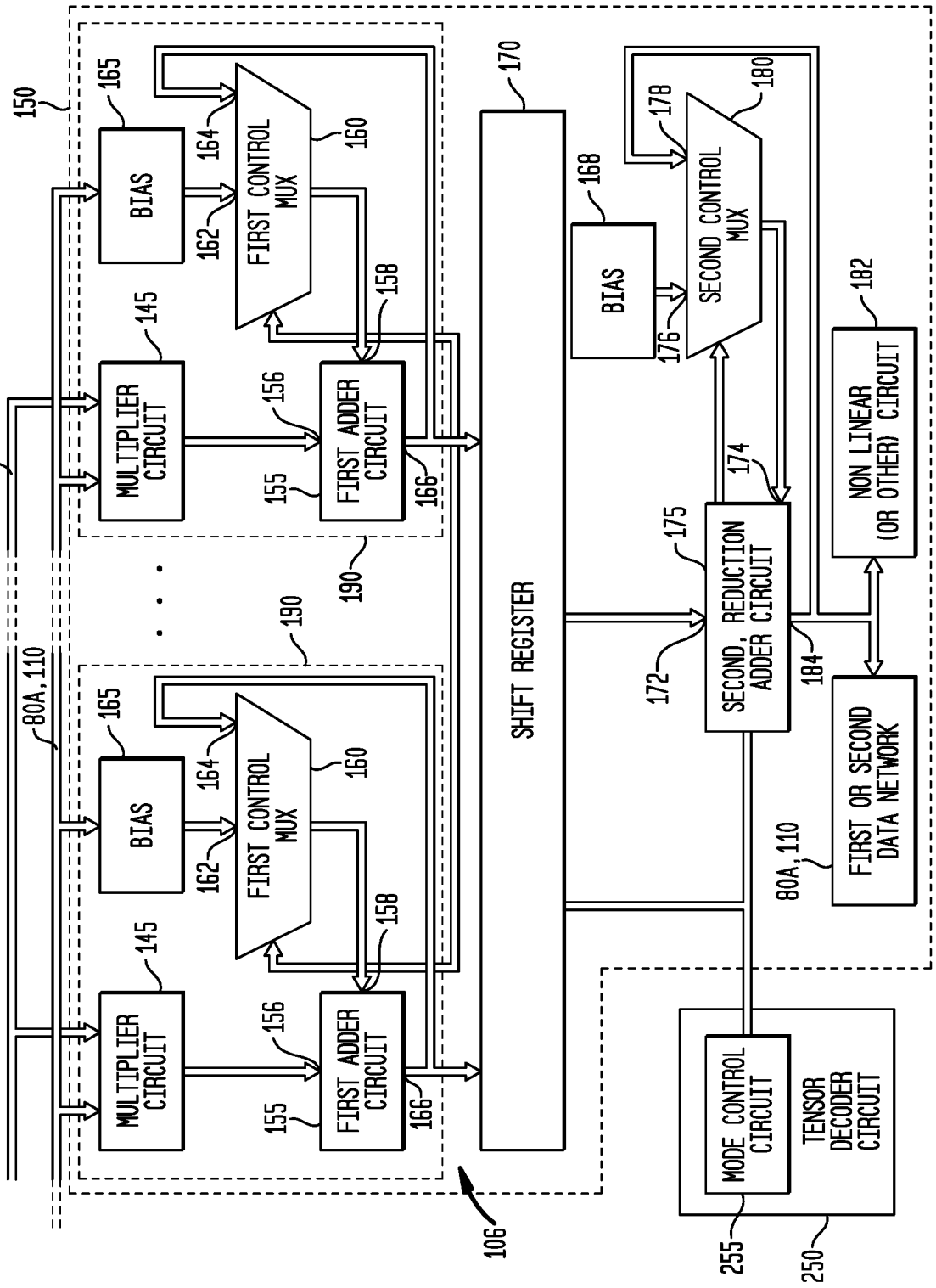
FIG. 6 is a block diagram of a representative embodiment of a vector-vector accelerator circuit having a plurality of multiply and accumulate ("MAC") circuits.

FIG. 6 is a block diagram of a representative embodiment of a VV accelerator circuit 150 having an array 106 of a plurality of multiply and accumulate (MAC) circuits 190. Each MAC circuit 190 comprises a multiplier 145, a first adder 155, and optionally a first control multiplexer ("MUX") 160. The multiplier 145 multiplies map data (as a first word) from the maps buffer 105 by corresponding kernel (weight) data (as a second word) from the corresponding kernel buffer 125, and provides as its output an intermediate, multiplicative product as a first input (156) to the first adder 155. The first adder 155, in turn, will add that intermediate, multiplicative product to a second input (158), which second input (158) is the output from the first control MUX 160, and provide that resulting sum as a first (or next) accumulation sum. The first control MUX 160 receives, as a first input (162), a first bias parameter (which may be from a register 165 (as illustrated) or provided via the second, data access network 110 and/or first, data distribution network 80A (not separately illustrated)), and as a second input (164), 5 feedback of the first (or next) accumulation sum. The first bias parameter, for example, may be a parameter or other value (e.g., a constant or a variable value) utilized to normalize the resulting data. The feedback of the first (or next) accumulation sum is provided for the first adder 155 to perform an ongoing accumulation, adding the first (or next) accumulation sum to the current multiplicative product received from the multiplier 145, to produce a next accumulation sum. Under the control of a first mode control word provided by the tensor decoder circuit 250 and/or the MM processor circuit 200, one of these two inputs (162 or 164), namely, the first bias parameter or the first (or next) accumulation sum, is selected by the first control MUX 160 as the second input (158) into the first adder 155, which adds it to the current multiplicative product received from 15 the multiplier 145 to produce a next accumulation sum, which is output (166) to a shift register 170. Alternatively, in the event that nothing is to be added to the current multiplicative product by the first adder 155, the first bias parameter or the second input (158) can be set to zero and selected as the second input into the first adder 155. Also alternatively, in the event a bias parameter is not to be selectively added to the current 20 multiplicative product by the first adder 155, optionally the first control MUX 160 may be omitted, with the feedback of the first (or next) accumulation sum provided directly as an input to the first adder 155 for ongoing accumulation.

The shift register 170 receives such accumulation sum outputs (166) from each of the MAC circuits 190, and sequentially shifts these outputs to provide them as one or more first inputs (172) to a second, reduction adder 175. The reduction adder 175, in turn, will add that accumulation sum output from a MAC circuit 190 (provided via shift register 170) to a second input (174) to the reduction adder 175, which second input (174) is the output from a second control multiplexer ("MUX") 180, to provide a second (or next) accumulation sum. The second control MUX 180 also receives, as a first input (176), a second bias parameter (which may be from a register 168 (as illustrated) or provided via the second, data access network 110 and/or first, data distribution network 80A (not separately illustrated)), and as a second input (178), feedback of the second (or next) accumulation sum. The second bias parameter, for example, may be a parameter or other value (e.g., a constant or a variable value) utilized to normalize the resulting data, and may be the same as or different from the first bias parameter. The feedback of the second (or next) accumulation sum is provided for the reduction adder 175 to perform an ongoing accumulation, such as across all or some of the MAC circuits 190, adding the second (or next) accumulation sum to the current output from a MAC circuit 190 provided via the shift register 170. Under the control of a second mode control word provided by the tensor decoder circuit 250 and/or the MM processor circuit 200, one of these two inputs (176, 178), namely, the second bias parameter or the second (or next) accumulation value, is selected by the second control MUX 180 as the second input into the reduction adder 175. The reduction adder 175 adds the selected second input to the current accumulation sum received from the shift register 170 to produce the second (or next) accumulation sum, which can be provided as an output 184 from the VV accelerator circuit 150 (to the second, data access network 110 and/or first, data distribution network 80A (such as for storage in memory 25 or the maps buffer 105), or to another linear or nonlinear computation circuit 182, or to another MAC circuit 190 or to the MAX circuit 130 (such as for maxpooling), for example and without limitation) or which can be fed back through the second control MUX 180 for ongoing accumulation to produce a next accumulation sum. Alternatively, in the event that nothing is to be added to the accumulation sum output from a MAC circuit 190, either the second bias parameter or the second input (174) can be set to zero and selected as the second input into the reduction adder 175. Those having skill in the art will recognize that as multiple outputs are provided, multiple multiply and accumulation operations can be performed successively and iteratively across such outputs, eventually obtaining the complete multiplication of a matrix by another matrix.

It should be noted that in representative embodiments, at least one of the first control multiplexers (MUXes) 160 or the second control multiplexer (MUX) 180 are included in the VV accelerator circuit 150. For example, the first control MUX 160 may be optional, and may be included or not included in the MAC circuit 190 depending upon the granularity of the control selected or desired to be implemented, as described in greater detail below. Also for example, when the first control MUX 160 is included, the second control MUX 180 may be optional, and vice-versa.

It should also be noted that depending upon the description and ordering within the description, a second control MUX 180 may be referred to as a first control MUX 180 and a first control MUX 160 may be referred to as a second control MUX 160. For example, when the first control MUX 160 is optional, the second control MUX 180 is then typically referred to as a first control MUX 180 or more simply as a control MUX 180. Whether either of these multiplexers 160, 180 is referred to as first or second is largely irrelevant; rather, what is important is that a control MUX 180 is coupled to the reduction adder 175, while a control MUX 160 is coupled to a first adder 155, as an option.

In another representative embodiment, both the first control multiplexers (MUXes) 160 and the second control multiplexer (MUX) 180 are included in the VV accelerator circuit 150. For such a representative embodiment, each of the first control multiplexers 160 and the second control multiplexer 180 of each of the VV accelerator circuits 150 are also coupled to the tensor decoder circuit 250 and/or the MM processor circuit 200 to receive, respectively, first and second mode control words, which determine the operational mode of the VV accelerator circuit 150. In another representative embodiment, only the control MUX 180 is included in the VV accelerator circuit 150.

For any of these various embodiments, these operational modes of the VV accelerator circuit 150 may include:

(1) An independent mode, in which each of the MAC circuits 190 provides a corresponding first (or next) accumulation sum as a complete result to the shift register 170, each of which may then be modified by the reduction adder 175 to the extent of adding in a second bias parameter (or not, if such a bias parameter was already added as the first bias parameter by the first adder 155, or if no bias parameter is being included). In a representative example, without limitation, when sixteen MAC circuits 190 are implemented in a VV accelerator circuit 150, such a second (or first) mode control word may be [1111111111111111], for example and without limitation, such as selecting the addition by the reduction adder 175 of the second bias parameter to each first (or next) accumulation sum, which are then provided as sixteen successive outputs from the VV accelerator circuit 150.

(2) A cooperative mode, in which each of the MAC circuits 190 provides a first (or next) accumulation sum as a corresponding partial result to the shift register 170. In a first cycle of the reduction adder 175, the first such partial result is added to a second bias parameter (if any) to provide a second (or next) accumulation sum, and in successive cycles, each successive second (or next) accumulation sum is selected for feedback through the second control multiplexer (MUX) 180)) and is then successively added by the reduction adder 175 to the current second (or next) accumulation sum provided by the shift register 170, thereby providing a single overall accumulation result as a single output from the VV accelerator circuit 150. Also in a representative example, without limitation, when sixteen MAC circuits 190 are implemented in a VV accelerator circuit 150, such a second mode control word may be [1000000000000000], selecting the addition by the reduction adder 175 of the second bias parameter to the first (or next) accumulation sum in the first cycle, followed by selecting successive feedback of the second (or next) accumulation sum, which is then successively added by the reduction adder 175 to the current second (or next) accumulation sum provided by the shift register 170, resulting in a single overall accumulation result provided as a single output from the VV accelerator circuit 150.

(3) Any of several combined, blended or intermediate cooperative and independent modes, each of which generates different sequences of outputs from each VV accelerator circuit 150 with varying degrees of accumulation. Continuing with the example, without limitation, when sixteen MAC circuits 190 are implemented in a VV accelerator circuit 150, different groups of MAC circuits 190 may be selected to operate in a cooperative mode, independently of other groups of MAC circuits 190 which are each collectively operating in their own cooperative modes, allowing for selection of:

(A) a single output selected (a fully cooperative mode, with a second (or first) mode control word being, for example and without limitation, [1000000000000000]), as discussed above;

(B) 16 separate outputs selected (a fully independent mode, with a second (or first) mode control word being, for example and without limitation, [1111111111111111]);

(C) two outputs selected (a first intermediate cooperative and independent mode) in which two groups of eight MAC circuits 190 are selected, functioning in a cooperative mode within a group, but with each group itself operating independently from the other group (with a second mode control word being, for example and without limitation, [1000000010000000]);

(D) four outputs selected (a second intermediate cooperative and independent mode) in which four groups of four MAC circuits 190 are selected, also functioning in a cooperative mode within a group, but with each group itself operating independently from the other group (with a second mode control word being, for example and without limitation, [1000100010001000]); and (E) eight outputs selected (a third intermediate cooperative and independent mode) in which eight groups of two MAC circuits 190 are selected, also functioning in a cooperative mode within a group, but with each group itself operating independently from the other group (with a second mode control word being, for example, [1010101010101010]).

Those having skill in the art will recognize that other combinations of combined, blended or intermediate cooperative and independent modes are available, depending upon the number of MAC circuits 190 which are implemented. Those having skill in the art will also recognize that for any of these operational modes, any bias parameter may be added in separately by the first adder 155. In addition, additional control is also provided using the first control MUX 160 of the MAC circuits 190, each of which can also be selected for feedback of a first (or next) accumulation sum for addition to the multiplicative product, also providing for significant accumulation by each MAC circuit 190, e.g., over hundreds to thousands of instructions or cycles. This is especially helpful in preserving high resolution, as some bits and resolution may be lost if intermediate results have to be stored to memory 25 (e.g., reducing accumulation at 32 bits to storage of only 16 bits). Any and all of these selections, implementations or combinations are considered equivalent and within the scope of the disclosure In addition, using these different operational modes, different kinds of parallelism may be exploited, and in different combinations. For example, fully independent modes and intermediate cooperative and independent modes may be more efficient for parallelism across kernels (inter-kernel parallelism). The MM accelerator circuit 100 architecture of the inference engine circuit architecture 50 allows for complete exploitation of any type of relevant parallelism. For example, the MAC circuits 190 of a VV accelerator circuit 150 may share both maps data (intra-map parallelism) and kernel data (intra-activation parallelism), for providing one output in a cooperative mode. Also for example, the MAC circuits 190 of a VV accelerator circuit 150 may share maps data (intra-map parallelism) and utilize different kernel data (inter-activation parallelism), for providing multiple outputs in an independent mode. Also for example, the MAC circuits 190 of a VV accelerator circuit 150 may utilize different maps data and share kernel data, also for providing multiple outputs in an independent mode. Also for example, the MAC circuits 190 of a VV accelerator circuit 150 may share different parts of the maps data (e.g., the same pixel position in different maps layers) and utilize different kernel data, also for providing one output in a cooperative mode. All of these types of exploitation of parallelism are possible with the inference engine circuit architecture 50.

Referring again to FIGS. 3 and 4, the MM accelerator circuit 100, or the maps buffer 105, or the second, data access network 110 (or first, data distribution network 80A) includes a maps buffer arbiter circuit 185. The maps buffer arbiter circuit 185 provides the request response mechanism for the maps buffer 105. The maps buffer arbiter circuit 185 receives addresses from the operand collector 260 (discussed below) and the various decoders of the tensor decoder circuit 250. Using the received address, the maps buffer arbiter circuit 185 obtains the requested data from the appropriate bank of the maps buffer 105, and then forwards the requested data (via the second, data access network 110 (or first, data distribution network 80A)) to either the operand collector 260 or to the appropriate MAC circuit 190 or MAX circuit 130. The maps buffer arbiter circuit 185 typically comprises state machine and control logic circuits 290 and various registers 270, illustrated and discussed below with reference to FIG. 8. As various incoming requests may conflict with each other for access to the maps buffer 105, the requests may be stored in the registers 270, and conflicts resolved (arbitrated) (e.g., implementing a round robin protocol, for example and without limitation) by the state machine and control logic circuits 290, such that all of the various data requests are or become fulfilled.

Figure 7:
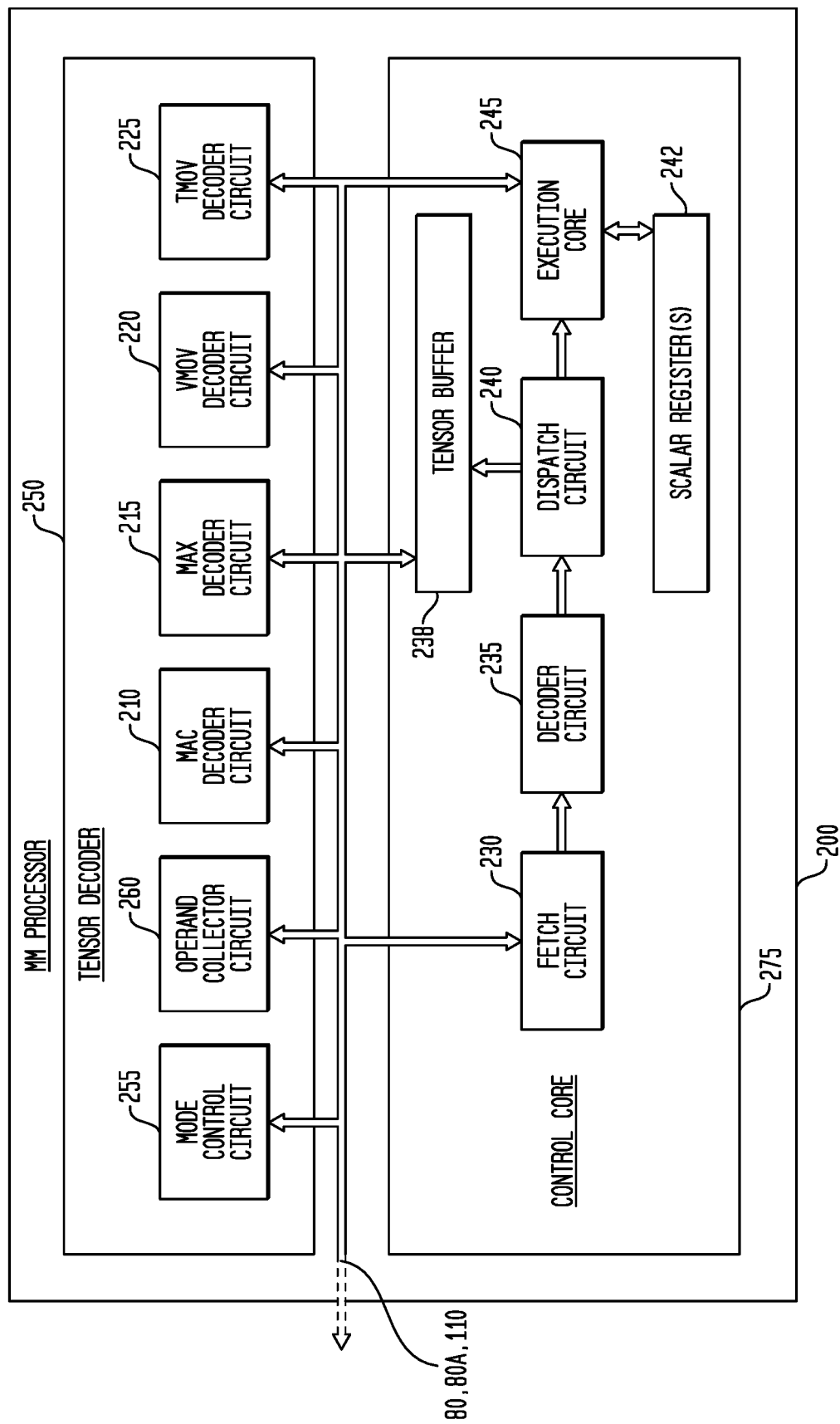
FIG. 7 is a block diagram of a representative embodiment of a matrix-matrix processor circuit.

FIG. 7 is a block diagram of a representative embodiment of a MM processor circuit 200. A representative embodiment of a MM processor circuit 200 comprises a tensor decoder circuit 250 and a control core 275 (also referred to as a "pipeline" controller or processor 275). Another representative embodiment of a MM processor circuit 200 comprises the control core 275 and, as mentioned above, in such embodiments, the tensor decoder circuit 250 is not included within the MM processor circuit 200. Instead, a plurality of tensor decoder circuits 250 are distributed throughout the inference engine circuit architecture 50, such as providing a tensor decoder circuit 250 for or in each MM accelerator circuit 100, as illustrated in FIG. 4. The tensor decoder circuit 250 functions the same, however, regardless of the location of the tensor decoder circuit 250 within either a MM accelerator circuit 100 or a MM processor circuit 200 or elsewhere within the inference engine circuit architecture 50.

As the inference engine circuit architecture 50 receives instructions for execution or other processing, those instructions are provided to or fetched by the control core 275, by fetch circuit 230, and are decoded into a type of instruction, using decoder circuit 235. Any tensor instructions (used for running tensor operations) or vector instructions (used for preloading vector data and loading configurations in the MM accelerator circuit 100), for execution by a MM accelerator circuit 100, are provided to and queued in the tensor instruction buffer 238 by the dispatch circuit 240. Other instructions (e.g., scalar instructions, used for metadata manipulation and bookkeeping) which are not for the MM accelerator circuits 100 are dispatched for execution by the control core 275 (dispatch circuit 240), and subsequently may be executed by the control core 275, such as using execution (or processor) core 245.

For example, the decoder circuit 235 will determine whether a scalar instruction has any data dependencies, and if so, will hold the instruction until the dependencies resolve. The decoder circuit 235 will also serve to synchronize instructions which will be going out the VV accelerator circuits 150 (MV accelerator circuits 115). One or more scalar register(s) 242 within the control core 275 includes registers to hold various metadata, such as to manipulate or add to various addresses. The scalar register(s) 242 can also be used for general purposes, such as a scratchpad for computing, and for any special functions, such as for address manipulation in the dispatch stage.

The dispatch circuit 240 receives decoded or partially decoded instructions. The dispatch circuit 240 also conducts data dependency checks for both the maps buffer 105 and the kernel buffers 125, such as checking for read after write operations (e.g., if a load operation is not complete, it will stall a MAC circuit 190). The dispatch circuit 240 also collects any metadata, which it will send to the appropriate execution unit (execution (or processor) core, 245, VV accelerator circuits 150 or MV accelerator circuits 115).

Whether located within the various MM accelerator circuits 100 or located within the MM processor circuit 200, the tensor decoder circuit 250 is structured or adapted to offload significant processing work from the control core 275, enabling the control core 275 to execute other instructions and perform other computations, particularly while the MM accelerator circuit 100 may be involved in computations occurring over hundreds to thousands of cycles, for example and without limitation. For example, the control core 275 may generate a base address to the tensor decoder circuit 250, which will then compute all of the addressing to move data into or out of a MM accelerator circuit 100 and/or between the memory circuit 25 and a MM accelerator circuit 100. The tensor decoder circuit 250 receives tensor instructions from the tensor buffer 238, such as instructions for execution by the MAC circuits 190 (MAC instructions), the MAX circuit 130 (MAX instructions), and instructions to move data into or out of the MM accelerator circuit 100 (tensor data move and vector data move instructions), such as to and from the memory circuit 25 and to and from any of the MAC circuits 190 or MAX circuits 130.

Figure 8:
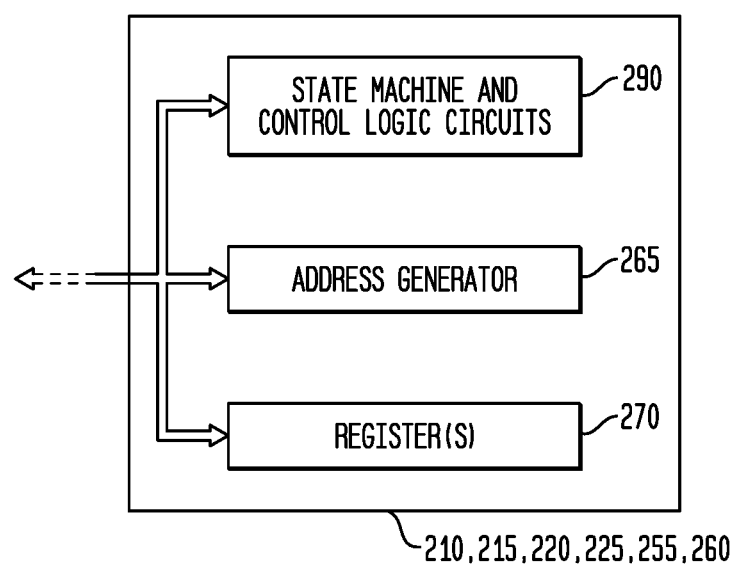
FIG. 8 is a block diagram of a representative embodiment of a maps buffer arbiter circuit, and a decoder circuit, a mode control circuit, and an operand collector circuit of a tensor decoder circuit.

The tensor decoder circuit 250 comprises a MAC decoder circuit 210, a MAX decoder circuit 215, a vector data move ("VMOV") decoder circuit 220, a tensor data move ("TMOV") decoder circuit 225, an operand collector 260, and a mode control circuit 255. Each of these components has the same general circuit structure, illustrated in FIG. 8. FIG. 8 is a block diagram of a representative embodiment of a maps buffer arbiter circuit 185, and of a decoder circuit 210, 215, 220, 225, a mode control circuit 255, and an operand collector circuit 260 of a tensor decoder circuit 250. Each of the maps buffer arbiter circuit 185, decoder circuits 210, 215, 220, 225, mode control circuit 255, and operand collector circuit 260 typically comprise state machine and control logic circuits 290 structured or adapted to perform the functions of the particular component and registers 270 to store various kinds of data, such as addresses. In addition, the decoder circuits 210, 215, 220, 225 also typically comprise an address generator circuit 265, used to calculate and generate addresses for obtaining or storing data in any of the memory circuit 25, the maps buffer 105, or the kernel buffers 125.

In operation, the VMOV decoder circuit 220 generates and holds addresses until the memory 25 may be ready to receive the data request. Like the MAC decoder circuit 210, the TMOV decoder circuit 225 checks for the availability of physical resources for data movement, and checks to avoid data conflicts, such as write after read dependencies. The TMOV decoder circuit 225 generates and holds addresses for data movement between the maps buffer 105 and the memory circuit 25, and also between and among the MM accelerator circuits 100. For example, the TMOV decoder circuit 225 may buffer data while waiting for the memory circuit 25 to be available. Using the VMOV decoder circuit 220 and TMOV decoder circuit 225, address generation for data movement may be offloaded from the control core 275, which is then free to perform other operations.

The MAC decoder circuit 210 determines whether the top instruction on the tensor buffer 238 is a MAC instruction, and if not, it waits for a MAC instruction to appear in the tensor buffer 238. When it obtains a MAC instruction, using state machine and control logic circuits 290, the MAC decoder circuit 210 then determines if the MAC instruction(s) has resource constraints, such as whether the physical links to the maps buffer 105 that are used by some VV accelerator circuits 150 are already occupied by other activities, such as from MAX instructions, VMOV instructions, or TMOV instructions. If these links are occupied, the MAC decoder circuit 210 waits until those links are free, to avoid link conflicts. If these links are not occupied, the MAC decoder circuit 210 takes the MAC instruction from the tensor buffer 238 and starts executing it. Using state machine and control logic circuits 290, the MAC decoder circuit 210 also makes sure that there is sufficient (e.g., 16 cycle) latency available for writing data back to the maps buffer 105, such as may be required by the shift register 170 and reduction adder 175. If some cycles are remaining, it stalls the new tensor instruction. The MAC decoder circuit 210 also ensures that VV accelerator circuits 150 in the current tensor instruction are not addressing the same memory bank of the maps buffer 105 as the previous tensor instruction at the same time, to avoid bank conflicts. Using state machine and control logic circuits 290 and address generation circuits 265, the MAC decoder circuit 210 executes by outputting addresses starting at a base address (e.g., 132) and incrementing (including any stride 138 increments) until the current address is equal to the base address plus the tensor length (plus any stride 138 increments for non-contiguous data which may be part of a tensor 144), illustrated as last or end address 142 for the tensor length illustrated in and discussed with reference to FIG. 2, and provides these output addresses to the operand collector 260 (when the operand collector 260 is ready). The MAX decoder circuit 215 functions identically to the MAC decoder circuit 210, but does so for instructions applicable to the MAX circuit 130.

The operand collector circuit 260 receives addresses from the MAC decoder circuit 210 and transfers those addresses to the maps buffer arbiter circuit 185 (or the maps buffer 105) and to the kernel buffers 125. The maps buffer 105 and the kernel buffers 125 then transfer the requested data to the operand collector circuit 260 which then supplies the data appropriately to the VV accelerator circuits 150 (MV accelerator circuits 115) based on the compute mode, as discussed above (e.g., shared maps data, different kernel data, etc., for example and without limitation).

More particularly, the operand collector circuit 260 receive addresses from the MAC decoder circuit 210. Based on the selected operational mode (e.g., independent mode (e.g., 16 outputs from a VV accelerator circuit 150), cooperative mode (e.g., a single output from a VV accelerator circuit 150), or a blended independent/cooperative mode (e.g., 2, 4, or 8 outputs selected from a VV accelerator circuit 150), the operand collector circuit 260 ensures that the transaction is a hit, i.e., that the data is in the maps buffer 105 or the kernel buffers 125. If the data is not available, the operand collector circuit 260 sends a stall message or flag to the MAC decoder circuit 210 until the data is received. Such a stall depends on the operational mode. For example, in independent mode, the stall depends on the word address within a vector and for the cooperative mode a stall is not encountered. When the data is obtained (following a hit or if the data is received following a miss), the data is buffered (e.g., in registers 270) and appropriate amounts or packets of that data are then transferred to the VV accelerator circuits 150 (MV accelerator circuits 115). In independent mode, some unnecessary words may be shifted out before sending data to the VV accelerator circuits 150 (MV accelerator circuits 115). The operand collector circuit 260 may also buffer operational metadata that is sent out to cooperative mode with maps or kernel data.

The mode control circuit 255 is optional, and in a representative embodiment, is used to hold and distribute mode control words (described above) to the first control MUX 160 and/or second control MUX) 180 of the VV accelerator circuits 150 (MV accelerator circuits 115), via the second, data access network 110 and/or first, data distribution network 80A or via the control bus 195. The mode to be implemented is typically selected by the user, and may be implemented at compile time, for example and without limitation. When a mode control circuit 255 is not included, the functions of storing and/or distributing mode control words may be performed by other components of either the tensor decoder circuit 250 or the control core 275.

Figure 9:
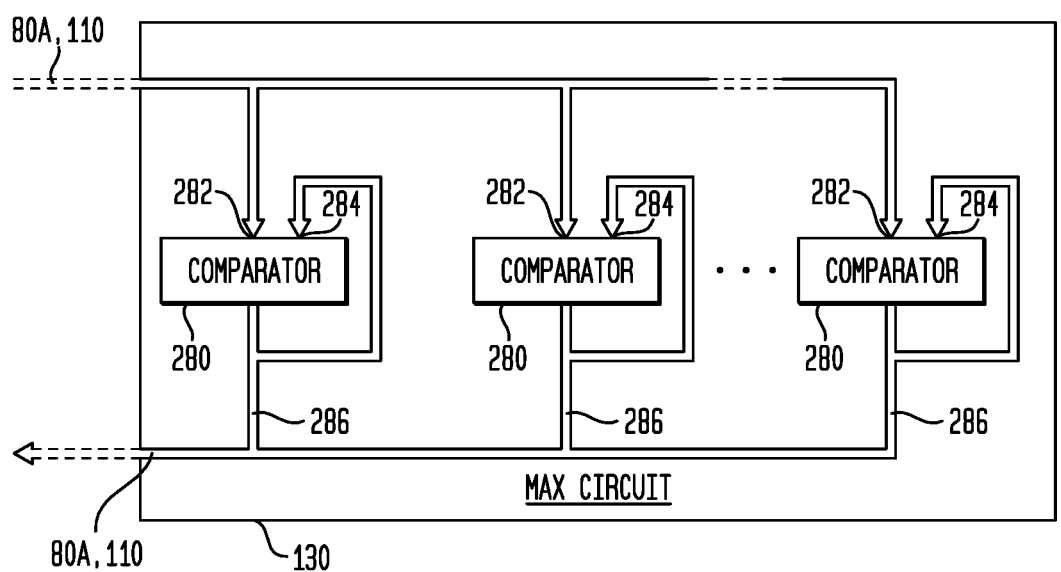
FIG. 9 is a block diagram of a representative embodiment of a MAX circuit.

FIG. 9 is a block diagram of a representative embodiment of a MAX circuit 130, and is illustrated for completeness. The MAX circuit 130 is comprised of a plurality of comparators 280, and is utilized to obtain a maximum of the operands being compared, such as to implement a maxpooling operation of a CNN. An operand is input (input 282) (via the second, data access network 110 and/or first, data distribution network 80A) and compared with a second input (284) (which may be initialized to zero, for example, for the first comparison cycle), with the current highest value (or maximum) being fed back (input 284) for ongoing comparisons, until a maximum value had been obtained and output (286).

Figure 10A:
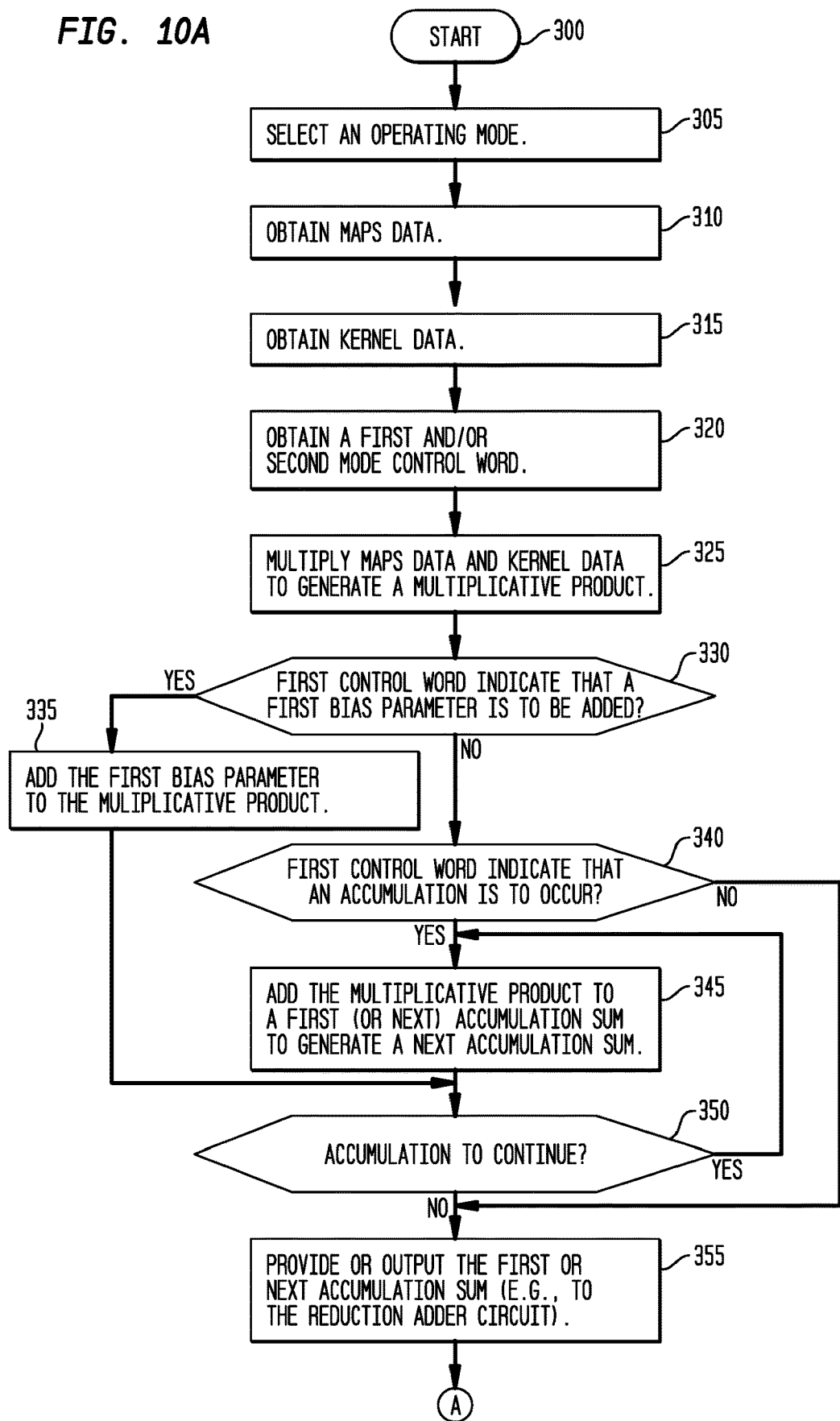

FIG. 10 is a flow chart of a representative embodiment of a method of performing matrix multiplication using the inference engine circuit architecture or system 50, and provides a useful summary. It should be noted that the various steps illustrated in FIG. 10 may occur in a wide variety of orders, and all such variations are considered equivalent and within the scope of the disclosure. Beginning with start step 300, an operating mode is selected, step 305, such as at compile time. As discussed above, maps data is obtained, step 310, kernel data is obtained, step 315, and a first and/or second control word is obtained, step 320. Maps data and kernel data are multiplied to generate a multiplicative product, step 325, using multiplier circuit 145. When a first control word indicates that a first bias parameter is to be added, step 330, the first bias parameter is added to the multiplicative product, step 335, using the first adder circuit 155, and the method proceeds to step 350. When the first control word does not indicate that a first bias parameter is to be added, step 330, the method determines whether the first control word indicates that an accumulation is to occur, step 340. When an accumulation is to occur in step 340, the multiplicative product is added to a first (or next) accumulation sum to generate a next accumulation sum, step 345, using the first adder circuit 155. When accumulation is to continue, step 350, the method returns to step 345 and iterates. When accumulation is not to continue, step 350, the method provides the first or next accumulation sum to the reduction adder circuit 175, step 355, such as via the shift register 170.

When a second control word indicates that a second bias parameter is to be added, step 360, the second bias parameter is added to the first or next accumulation sum, step 365, using the reduction adder 175, and the method proceeds to step 380. When the second control word does not indicate that a second bias parameter is to be added, step 360, the method determines whether the second control word indicates that an accumulation is to occur, step 370. When an accumulation is to occur in step 370, the first or next accumulation sum is added to a next accumulation sum to generate a second or next accumulation sum, step 375, using the reduction adder circuit 175. When accumulation is to continue, step 380, the method returns to step 375 and iterates. When accumulation is not to continue, step 380, the method provides the second or next accumulation sum as an output result, step 385, and the method may end, return step 390.

Numerous advantages of the representative embodiments are readily apparent. The representative inference engine circuit architecture 50 provides a computing architecture capable of providing high performance for CNN applications, for applications such as artificial intelligence, machine learning, image recognition, and other inferential applications requiring mathematical computations, for example and without limitation. The inference engine circuit architecture (system) 50 has comparatively high efficiency, with significant utilization (about 95%), and has a comparatively low bandwidth for access to any memory integrated circuit storing the maps and kernel data. The inference engine circuit architecture 50 is capable of performing a complete matrix-by-matrix multiplication.

The inference engine circuit architecture 50 reaches 99.9% efficiency in a large majority of deep neural network layers, eliminating dead or dark silicon and making the most of every watt of power. The inference engine circuit architecture 50 can provide easier scaling than systolic arrays, at the multiple of VV accelerator circuits 150. Beyond MV accelerator circuits 115, the inference engine circuit architecture 50 scales with MM accelerator circuits 100, as shown in FIG. 1.

As used herein, a "processor" 75 or control core 275 may be any type of processor or controller, and may be embodied as one or more processor(s) 75, 275 configured, designed, programmed or otherwise adapted to perform the functionality discussed herein. As the term processor or controller is used herein, a processor 75 may include use of a single integrated circuit ("IC"), or may include use of a plurality of integrated circuits or other components connected, arranged or grouped together, such as controllers, microprocessors, digital signal processors ("DSPs"), array processors, graphics or image processors, parallel processors, multiple core processors, custom ICs, application specific integrated circuits ("ASICs"), field programmable gate arrays ("FPGAs"), adaptive computing ICs, associated memory (such as RAM, DRAM and ROM), and other ICs and components, whether analog or digital. As a consequence, as used herein, the term processor or controller should be understood to equivalently mean and include a single IC, or arrangement of custom ICs, ASICs, processors, microprocessors, controllers, FPGAs, adaptive computing ICs, or some other grouping of integrated circuits which perform the functions discussed herein, with associated memory, such as microprocessor memory or additional RAM, DRAM, SDRAM, SRAM, MRAM, ROM, FLASH, EPROM or $E^2$PROM. A processor 75 or control core 275, with associated memory, may be adapted or configured (via programming, FPGA interconnection, or hard-wiring) to perform the methodology of the invention, as discussed herein. For example, the methodology may be programmed and stored, in a processor 75 or control core 275 with its associated memory (and/or memory 25) and other equivalent components, as a set of program instructions or other code (or equivalent configuration or other program) for subsequent execution when the processor 75 or control core 275 is operative (i.e., powered on and functioning). Equivalently, when the processor 75 or control core 275 may implemented in whole or part as FPGAs, custom ICs and/or ASICs, the FPGAs, custom ICs or ASICs also may be designed, configured and/or hard-wired to implement the methodology of the invention. For example, the processor 75 or control core 275 may be implemented as an arrangement of analog and/or digital circuits, controllers, microprocessors, DSPs and/or ASICs, collectively referred to as a "processor" or "controller", which are respectively hard-wired, programmed, designed, adapted or configured to implement the methodology of the invention, including possibly in conjunction with a memory 25.

The memory circuit 25, maps buffer 105, kernel buffer 125, and other registers or memory herein, which may include a data repository (or database), may be embodied in any number of forms, including within any computer or other machine-readable data storage medium, memory device or other storage or communication device for storage or communication of information, currently known or which becomes available in the future, including, but not limited to, a memory integrated circuit ("IC") (for memory 25), or memory portion of an integrated circuit (such as the resident memory within a processor 75 or control core 275 or processor IC, or such as maps buffer 105, kernel buffer 125, and other registers or memory herein), whether volatile or non-volatile, whether removable or non-removable, including without limitation RAM, FLASH, DRAM, SDRAM, SRAM, MRAM, FeRAM, ROM, EPROM or $E^2$PROM, or any other form of memory device, such as a magnetic hard drive, an optical drive, a magnetic disk or tape drive, a hard disk drive, other machine-readable storage or memory media such as a floppy disk, a CDROM, a CD-RW, digital versatile disk (DVD) or other optical memory, or any other type of memory, storage medium, or data storage apparatus or circuit, which is known or which becomes known, depending upon the selected embodiment. The memory circuit 25, maps buffer 105, kernel buffer 125, and other registers or memory herein may be adapted to store various look up tables, parameters, coefficients, other information and data, programs or instructions, and other types of tables such as database tables.

As indicated above, the processor 75 or control core 275 is hard-wired or programmed, using software and data structures of the invention, for example, to perform the methodology of the present invention. As a consequence, the system and related methods of the present invention, including the various instructions of a configuration memory, may be embodied as software which provides such programming or other instructions, such as a set of instructions and/or metadata embodied within a non-transitory computer readable medium, discussed above. In addition, metadata may also be utilized to define the various data structures of a look up table or a database. Such software may be in the form of source or object code, by way of example and without limitation. Source code further may be compiled into some form of instructions or object code (including assembly language instructions or configuration information). The software, source code or metadata of the present invention may be embodied as any type of code, such as C, C++, Matlab, SystemC, LISA, XML, Java, Brew, SQL and its variations (e.g., SQL 99 or proprietary versions of SQL), DB2, Oracle, or any other type of programming language which performs the functionality discussed herein, including various hardware definition or hardware modeling languages (e.g., Verilog, VHDL, RTL) and resulting database files (e.g., GDSII). As a consequence, a "construct", "program construct", "software construct" or "software", as used equivalently herein, means and refers to any programming language, of any kind, with any syntax or signatures, which provides or can be interpreted to provide the associated functionality or methodology specified (when instantiated or loaded into a processor or computer and executed, including the processor 75 or control core 275, for example).

The software, metadata, or other source code of the present invention and any resulting bit file (object code, database, or look up table) may be embodied within any tangible, non-transitory storage medium, such as any of the computer or other machine-readable data storage media, as computer-readable instructions, data structures, program modules or other data, such as discussed above with respect to the memory circuit 25, maps buffer 105, kernel buffer 125, and other registers or memory herein, e.g., a floppy disk, a CDROM, a CD-RW, a DVD, a magnetic hard drive, an optical drive, or any other type of data storage apparatus or medium, as mentioned above.

The communication interface 45 is utilized for appropriate connection to a relevant channel, network or bus; for example, the communication interface 45 may provide impedance matching, drivers and other functions for a wireline or wireless interface, may provide demodulation and analog to digital conversion for a wireless interface, and may provide a physical interface, respectively, for the processor 75 or control core 275 and/or memory circuit 25, with other devices. In general, the communication interface 45 is used to receive and transmit data, depending upon the selected embodiment, such as program instructions, parameters, configuration information, control messages, data and other pertinent information.

The communication interface 45 may be implemented as known or may become known in the art, to provide data communication to and from the inference engine circuit architecture 50 and any type of network or external device, such as wireless, optical, or wireline, and using any applicable standard (e.g., one of the various PCI, USB, RJ 45, Ethernet (Fast Ethernet, Gigabit Ethernet, 300ase-TX, 300ase-FX, etc.), IEEE 802.11, Bluetooth, WCDMA, WiFi, GSM, GPRS, EDGE, 3G and the other standards and systems mentioned above, for example and without limitation), and may include impedance matching capability, voltage translation for a low voltage processor to interface with a higher voltage control bus, wireline or wireless transceivers, and various switching mechanisms (e.g., transistors) to turn various lines or connectors on or off in response to signaling from processor 75 or control core 275. In addition, the communication interface 45 may also be configured and/or adapted to receive and/or transmit signals externally to the inference engine circuit architecture 50, such as through hard-wiring or RF or infrared signaling, for example, to receive information in real-time for output on a display, for example. The communication interface 45 may provide connection to any type of bus or network structure or medium, using any selected architecture. By way of example and without limitation, such architectures include Industry Standard Architecture (ISA) bus, Enhanced ISA (EISA) bus, Micro Channel Architecture (MCA) bus, Peripheral Component Interconnect (PCI) bus, SAN bus, or any other communication or signaling medium, such as Ethernet, ISDN, T1, satellite, wireless, and so on.

The present disclosure is to be considered as an exemplification of the principles of the invention and is not intended to limit the invention to the specific embodiments illustrated. In this respect, it is to be understood that the invention is not limited in its application to the details of construction and to the arrangements of components set forth above and below, illustrated in the drawings, or as described in the examples. Systems, methods and apparatuses consistent with the present invention are capable of other embodiments and of being practiced and carried out in various ways.

Although the invention has been described with respect to specific embodiments thereof, these embodiments are merely illustrative and not restrictive of the invention. In the description herein, numerous specific details are provided, such as examples of electronic components, electronic and structural connections, materials, and structural variations, to provide a thorough understanding of embodiments of the present invention. One skilled in the relevant art will recognize, however, that an embodiment of the invention can be practiced without one or more of the specific details, or with other apparatus, systems, assemblies, components, materials, parts, etc. In other instances, well-known structures, materials, or operations are not specifically shown or described in detail to avoid obscuring aspects of embodiments of the present invention. In addition, the various Figures are not drawn to scale and should not be regarded as limiting.

Reference throughout this specification to "one embodiment", "an embodiment", or a specific "embodiment" means that a particular feature, structure, or characteristic described in connection with the embodiment is included in at least one embodiment of the present invention and not necessarily in all embodiments, and further, are not necessarily referring to the same embodiment. Furthermore, the particular features, structures, or characteristics of any specific embodiment of the present invention may be combined in any suitable manner and in any suitable combination with one or more other embodiments, including the use of selected features without corresponding use of other features. In addition, many modifications may be made to adapt a particular application, situation or material to the essential scope and spirit of the present invention. It is to be understood that other variations and modifications of the embodiments of the present invention described and illustrated herein are possible in light of the teachings herein and are to be considered part of the spirit and scope of the present invention.

For the recitation of numeric ranges herein, each intervening number there between with the same degree of precision is explicitly contemplated. For example, for the range of 6-9, the numbers 7 and 8 are contemplated in addition to 6 and 9, and for the range 6.0-7.0, the number 6.0, 6.1, 6.2, 6.3, 6.4, 6.5, 6.6, 6.7, 6.8, 6.9, and 7.0 are explicitly contemplated. In addition, every intervening sub-range within range is contemplated, in any combination, and is within the scope of the disclosure. For example, for the range of 5-10, the sub-ranges 5-6, 5-7, 5-8, 5-9, 6-7, 6-8, 6-9, 6-10, 7-8, 7-9, 7-10, 8-9, 8-10, and 9-10 are contemplated and within the scope of the disclosed range.

It will also be appreciated that one or more of the elements depicted in the Figures can also be implemented in a more separate or integrated manner, or even removed or rendered inoperable in certain cases, as may be useful in accordance with a particular application. Integrally formed combinations of components are also within the scope of the invention, particularly for embodiments in which a separation or combination of discrete components is unclear or indiscernible. In addition, use of the term "coupled" herein, including in its various forms such as "coupling" or "couplable", means and includes any direct or indirect electrical, structural or magnetic coupling, connection or attachment, or adaptation or capability for such a direct or indirect electrical, structural or magnetic coupling, connection or attachment, including integrally formed components and components which are coupled via or through another component.

With respect to signals, we refer herein to parameters that "represent" a given metric or are "representative" of a given metric, where a metric is a measure of a state of at least part of the regulator or its inputs or outputs. A parameter is considered to represent a metric if it is related to the metric directly enough that regulating the parameter will satisfactorily regulate the metric. A parameter may be considered to be an acceptable representation of a metric if it represents a multiple or fraction of the metric.

Furthermore, any signal arrows in the drawings/Figures should be considered only exemplary, and not limiting, unless otherwise specifically noted. Combinations of components of steps will also be considered within the scope of the present invention, particularly where the ability to separate or combine is unclear or foreseeable. The disjunctive term "or", as used herein and throughout the claims that follow, is generally intended to mean "and/or", having both conjunctive and disjunctive meanings (and is not confined to an "exclusive or" meaning), unless otherwise indicated. As used in the description herein and throughout the claims that follow, "a", "an", and "the" include plural references unless the context clearly dictates otherwise. Also as used in the description herein and throughout the claims that follow, the meaning of "in" includes "in" and "on" unless the context clearly dictates otherwise.

The foregoing description of illustrated embodiments of the present invention, including what is described in the summary or in the abstract, is not intended to be exhaustive or to limit the invention to the precise forms disclosed herein. From the foregoing, it will be observed that numerous variations, modifications and substitutions are intended and may be effected without departing from the spirit and scope of the novel concept of the invention. It is to be understood that no limitation with respect to the specific methods and apparatus illustrated herein is intended or should be inferred. It is, of course, intended to cover by the appended claims all such modifications as fall within the scope of the claims.

It is claimed:

1. An acceleration circuit connectable to a memory circuit, the acceleration circuit comprising:
   a first data network connectable to the memory circuit;
   a first buffer circuit configured to store maps data;
   a second data network coupled to the first buffer circuit;
   a second buffer circuit configured to store kernel data;
   a plurality of vector-vector acceleration circuits arranged in an array, each vector-vector acceleration circuit of the plurality of vector-vector acceleration circuits comprising:
   a plurality of multiply and accumulate circuits arranged in a first array and coupled through the second data network to the first buffer circuit, each multiply and accumulate circuit of the plurality of multiply and accumulate circuits comprising:
   a multiplier circuit configured to multiply a maps datum and a kernel datum to generate a multiplicative product;
   a first adder circuit coupled to the multiplier circuit and configured to generate a first accumulation sum by adding the multiplicative product to a first bias parameter or to a feedback of the first accumulation sum;
   a shift register coupled to the plurality of multiply and accumulate circuits;
   a first control multiplexer configured to provide a selected first multiplexer output in response to a plurality of mode control words, the selected first multiplexer output comprising a second bias parameter or a second accumulation sum; and
   a second adder circuit coupled to the shift register and to the first control multiplexer, the second adder circuit configured to generate the second accumulation sum by adding the first accumulation sum to the selected first multiplexer output;
   and
   a third, serial data network coupled to the second buffer circuit and to the plurality of vector-vector acceleration circuits of the array, the third, serial data network configured to provide kernel data to a first vector-vector acceleration circuit of the plurality of vector-vector acceleration circuits of the array and sequentially provide the kernel data to each next vector-vector acceleration circuit of the plurality of vector-vector acceleration circuits of the array.

2. The acceleration circuit of claim 1, wherein in response to a first mode control word of the plurality of mode control words, the first mode control word designating an independent mode for a selected vector-vector acceleration circuit of the plurality of vector-vector acceleration circuits, the first control multiplexer and second adder circuit are configured to successively provide the first accumulation sum from each multiply and accumulate circuit, of the plurality of multiply and accumulate circuits, as a plurality of outputs from the selected vector-vector acceleration circuit.

3. The acceleration circuit of claim 2, wherein in response to a second mode control word of the plurality of mode control words, the second mode control word designating a cooperative mode, the first control multiplexer and second adder circuit are configured to provide the second output accumulation sum as a single output from the selected vector-vector acceleration circuit.

4. The acceleration circuit of claim 3, wherein in response to a third mode control word of the plurality of mode control words, the third mode control word designating a combined independent and cooperative mode, the first control multiplexer and second adder circuit are configured to provide a plurality of second accumulation sums as the plurality of outputs from the selected vector-vector acceleration circuit.

5. The acceleration circuit of claim 1, wherein the third, serial data network comprises:
   a serial bus coupled to each vector-vector acceleration circuit of the plurality of vector-vector acceleration circuits; and
   a plurality of driver circuits coupled to the serial bus.

6. The acceleration circuit of claim 1, further comprising:
   a maps buffer arbiter circuit coupled to the first buffer circuit and to the second data network, the maps buffer arbiter circuit configured to determine a conflict in accessing the first buffer circuit and in response to the conflict, to implement a priority protocol for access to the first buffer circuit.

7. The acceleration circuit of claim 6, wherein the maps buffer arbiter circuit is further configured to receive an address for selected maps data in the first buffer circuit and, in response, to obtain and provide the selected maps data.

8. The acceleration circuit of claim 1, further comprising:
   a tensor decoder circuit coupled to the second data network, the tensor decoder circuit configured to generate and output a sequence of a plurality of output addresses starting with a base address and incrementing the base address until the output address is equal to the base address plus a tensor length.

9. The acceleration circuit of claim 8, wherein the tensor decoder circuit further comprises:
an operand collector coupled to the second data network, the operand collector configured to transfer the plurality of output addresses to a maps buffer arbiter circuit or to the second buffer circuit, to obtain data corresponding to the plurality of output addresses, and to transfer the obtained data to the plurality of multiply and accumulate circuits.

10. The acceleration circuit of claim 1, further comprising:
a mode control circuit configured to provide or generate the plurality of mode control words.

11. The acceleration circuit of claim 1, further comprising:
a MAX circuit comprising a plurality of comparators, the plurality of comparators configured to determine a maximum value of a plurality of second accumulation sums.

12. The acceleration circuit of claim 1, further comprising:
a plurality of second control multiplexers, each second control multiplexer of the plurality of second control multiplexers coupled correspondingly to the first adder circuit of each multiply and accumulate circuit of the plurality of multiply and accumulate circuits, each second control multiplexer of the plurality of second control multiplexers configured to provide a selected second multiplexer output in response to a corresponding mode control word of the plurality of mode control words, the selected second multiplexer output comprising the first bias parameter or the first accumulation sum.

13. An acceleration circuit connectable to a memory circuit, the acceleration circuit comprising:
a first data network connectable to the memory circuit;
a first buffer circuit configured to store maps data;
a second data network coupled to the first buffer circuit;
a plurality of second buffer circuits configured to store kernel data, each second buffer circuit of the plurality of second buffer circuits configured to store different kernel data than another second buffer circuit of the plurality of second buffer circuits;
a plurality of matrix-vector acceleration circuits, each matrix-vector acceleration circuit of the plurality of matrix-vector acceleration circuits comprising a plurality of vector-vector acceleration circuits arranged in an array, each vector-vector acceleration circuit of the plurality of vector-vector acceleration circuits coupled through the second data network to the first buffer circuit, each vector-vector acceleration circuit of the plurality of vector-vector acceleration circuits comprising:
a plurality of multiply and accumulate circuits, each multiply and accumulate circuit of the plurality of multiply and accumulate circuits comprising:
a multiplier circuit configured to multiply a maps datum and a kernel datum to generate a multiplicative product;
a first control multiplexer configured to provide a selected first multiplexer output in response to a plurality of mode control words, the selected first multiplexer output comprising a first bias parameter or a first accumulation sum, and
a first adder circuit coupled to the multiplier circuit and to the first control multiplexer, the first adder circuit configured to generate the first accumulation sum by adding the multiplicative product to the selected first multiplexer output;
a shift register coupled to the plurality of multiply and accumulate circuits, the shift register configured to receive and shift each first accumulation sum from each multiply and accumulate circuit of the plurality of multiply and accumulate circuits;
a second control multiplexer configured to provide a selected second multiplexer output in response to the plurality of mode control words, the selected second multiplexer output comprising a second bias parameter or a second accumulation sum; and
a second adder circuit coupled to the shift register and to the second control multiplexer, the second adder circuit configured generate the second accumulation sum by adding the first accumulation sum to the selected second multiplexer output;
and
a plurality of third, serial data networks, each third, serial data network of the plurality of third, serial data networks coupled to a corresponding second buffer circuit, of the plurality of second buffer circuits, and to a corresponding matrix-vector acceleration circuit of the plurality of matrix-vector acceleration circuits, each third, serial data network configured to provide kernel data to a first vector-vector acceleration circuit of the plurality of vector-vector acceleration circuits of the corresponding matrix-vector acceleration circuit and sequentially provide the kernel data to each next vector-vector acceleration circuit of the plurality of vector-vector acceleration circuits of the corresponding matrix-vector acceleration circuits.

14. The acceleration circuit of claim 13, wherein in response to a first mode control word of the plurality of mode control words, the first mode control word designating an independent mode for a selected vector-vector acceleration circuit of the plurality of vector-vector acceleration circuits, the second control multiplexer and second adder circuit are configured to successively provide the first accumulation sum from each multiply and accumulate circuit, of the plurality of multiply and accumulate circuits, as a plurality of outputs from the selected vector-vector acceleration circuit.

15. The acceleration circuit of claim 14, wherein in response to a second mode control word of the plurality of mode control words, the second mode control word designating a cooperative mode, the second control multiplexer and second adder circuit are configured to provide the second accumulation sum as a single output from the selected vector-vector acceleration circuit.

16. The acceleration circuit of claim 15, wherein in response to a third mode control word of the plurality of mode control words, the third mode control word designating a combined independent and cooperative mode, the second control multiplexer and second adder circuit are configured to provide a plurality of second accumulation sums as the plurality of outputs from the selected vector-vector acceleration circuit.

17. The acceleration circuit of claim 13, wherein each third, serial data network of the plurality of third, serial data networks comprises:
a serial bus coupled to each vector-vector acceleration circuit of the plurality of vector-vector acceleration circuits; and
a plurality of driver circuits coupled to the serial bus.

18. The acceleration circuit of claim 13, wherein a first serial data network of the plurality of third, serial data networks is configured to provide first kernel data to a first array of vector-vector acceleration circuits of a selected matrix-vector acceleration circuit of the plurality of matrix-vector acceleration circuits, and a second serial data network of the plurality of third serial data networks is configured to provide second kernel data to a second array of vector-vector acceleration circuits of the selected matrix-vector acceleration circuit of the plurality of matrix-vector acceleration circuits, the first kernel data different than the second kernel data.

19. The acceleration circuit of claim 13, further comprising:
a maps buffer arbiter circuit coupled to the first buffer circuit and to the second data network, the maps buffer arbiter circuit configured to determine a conflict in accessing the first buffer circuit and in response to the conflict, to implement a priority protocol for access to the first buffer circuit.

20. The acceleration circuit of claim 19, wherein the maps buffer arbiter circuit is further configured to receive an address for selected maps data in the first buffer circuit and, in response, to obtain and provide the selected maps data.

21. The acceleration circuit of claim 13, further comprising:
a tensor decoder circuit coupled to the second data network, the tensor decoder circuit configured to generate and output a sequence of a plurality of output addresses starting with a base address and incrementing the base address until the output address is equal to the base address plus a tensor length.

22. The acceleration circuit of claim 21, wherein the tensor decoder circuit further comprises:
an operand collector coupled to the second data network, the operand collector adapted to transfer the plurality of output addresses to a maps buffer arbiter circuit or to the plurality of second buffer circuits, to obtain data corresponding to the plurality of output addresses, and to transfer the obtained data to the plurality of multiply and accumulate circuits.

23. The acceleration circuit of claim 21, further comprising:
a tensor buffer coupled to the tensor decoder circuit; and
a control core coupled to the tensor decoder circuit and to the first data network, the control core configured to receive and decode a plurality of instructions, and to transfer a tensor instruction to the tensor buffer for execution by the tensor decoder circuit.

24. The acceleration circuit of claim 13, further comprising:
a mode control circuit adapted to provide or generate the plurality of mode control words.

25. An acceleration circuit connectable to a memory circuit, the acceleration circuit comprising:
a first data network connectable to the memory circuit;
a memory interface circuit coupled to the first data network;
a first buffer circuit configured to store maps data;
a second data network coupled to the first buffer circuit and to the memory interface circuit;
a plurality of second buffer circuits configured to store kernel data, each second buffer circuit of the plurality of second buffer circuits configured to store different kernel data than another second buffer circuit of the plurality of second buffer circuits;
at least one matrix-matrix acceleration circuit having a plurality of operating modes, the plurality of operating modes comprising an independent mode, a cooperative mode, and a plurality of combined independent and cooperative modes, the at least one matrix-matrix acceleration circuit comprising:
a plurality of multiply and accumulate circuits, each multiply and accumulate circuit of the plurality of multiply and accumulate circuits comprising:
a multiplier circuit configured to multiply a maps datum and a kernel datum to generate a multiplicative product; and
a first adder circuit coupled to the multiplier circuit and configured to generate a first accumulation sum by adding the multiplicative product to a first bias parameter or to a feedback of the first accumulation sum;
a shift register coupled to the plurality of multiply and accumulate circuits;
a control multiplexer configured to provide a selected control multiplexer output in response to a mode control word corresponding to a selected operating mode of the plurality of operating modes, the selected control multiplexer output comprising a second bias parameter or a second accumulation sum; and
a second adder circuit coupled to the shift register and to the control multiplexer, the second adder circuit configured to generate the second accumulation sum by adding the first accumulation sum to the selected control multiplexer output; and to provide the second accumulation sum as one or more outputs corresponding to the selected operating mode;
a plurality of third, serial data networks, each third, serial data network of the plurality of third, serial data networks coupled to a corresponding second buffer circuit, of the plurality of second buffer circuits, and to a corresponding matrix-vector acceleration circuit of the plurality of matrix-vector acceleration circuits, each third, serial data network configured to provide kernel data to a first vector-vector acceleration circuit of the plurality of vector-vector acceleration circuits of the corresponding matrix-vector acceleration circuit and sequentially provide the kernel data to each next vector-vector acceleration circuit of the plurality of vector-vector acceleration circuits of the corresponding matrix-vector acceleration circuits, wherein a first serial data network of the plurality of third, serial data networks is configured to provide first kernel data to a first array of vector-vector acceleration circuits of a selected matrix-vector acceleration circuit of the plurality of matrix-vector acceleration circuits, and a second serial data network of the plurality of third serial data networks is configured to provide second kernel data to a second array of vector-vector acceleration circuits of the selected matrix-vector acceleration circuit of the plurality of matrix-vector acceleration circuits, the first kernel data different than the second kernel data;
and
a MAX circuit comprising a plurality of comparators, the plurality of comparators configured to determine a maximum value of a plurality of second output accumulation sums.

* * * * *